US011568387B2

(12) United States Patent
Lu et al.

(10) Patent No.: US 11,568,387 B2
(45) Date of Patent: Jan. 31, 2023

(54) METHOD AND DEVICE FOR IMPLEMENTING PASSWORD-FREE EMV CONTACT TRANSACTION

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 263 days.

(21) Appl. No.: 16/770,832

(22) PCT Filed: Apr. 10, 2019

(86) PCT No.: PCT/CN2019/082013
§ 371 (c)(1),
(2) Date: Jun. 8, 2020

(87) PCT Pub. No.: WO2019/228074
PCT Pub. Date: Dec. 5, 2019

(65) Prior Publication Data
US 2021/0166217 A1    Jun. 3, 2021

(30) Foreign Application Priority Data
May 31, 2018   (CN) .......................... 201810547334.9

(51) Int. Cl.
*G06F 8/71*        (2018.01)
*G06F 9/44*        (2018.01)
(Continued)

(52) U.S. Cl.
CPC ........... *G06Q 20/3567* (2013.01); *G06F 8/71* (2013.01); *G06F 9/44594* (2013.01);
(Continued)

(58) Field of Classification Search
None
See application file for complete search history.

(56) References Cited

U.S. PATENT DOCUMENTS 8,046,261 B2 *  10/2011  Ghosh ................ G06Q 30/0601
                                                         705/26.1
8,768,838 B1 *   7/2014  Hoffman ............... G06Q 40/00
                                                          705/72
(Continued)

FOREIGN PATENT DOCUMENTS

CN         103679936 A  *  3/2014
WO    WO-2018090499 A1  *  5/2018    ........... G06Q 20/204

OTHER PUBLICATIONS

Murdoch, S. J., "Chip and PIN is Broken", 2010 IEEE Symposium on Security and Privacy (pp. 433-446) (Year: 2010).*

*Primary Examiner* — Neha Patel
*Assistant Examiner* — Clay C Lee
(74) *Attorney, Agent, or Firm* — Hammer & Associates, P.C.

(57) ABSTRACT

A method for realizing an EMV contact transaction without a password, wherein said method is implemented by an EMV IC card and a terminal, wherein when a terminal receives transaction information, it sets a password-free function setting; performs an offline data validation and limitation; performs terminal risk management and a behavior analysis; determines, on the basis of the password-free function setting, whether to perform online processing and performs transaction termination processing; the password-free function setting comprises: when an optional kernel configuration flag in an application parameter corresponding to the current application acquired is set and the transaction amount in the transaction information is greater than a password-free IC card transaction limitation amount, the current application is configured so that verifying the card- (Continued)

holder's PIN is obviated. The present invention allows password-free small-amount transactions, and obviates to upgrade IC cards.

20 Claims, 10 Drawing Sheets

(51) Int. Cl.
    *G06Q 20/20*     (2012.01)
    *G06Q 20/34*     (2012.01)
    *G06Q 20/38*     (2012.01)
    *G06Q 20/40*     (2012.01)
    *G06F 9/445*     (2018.01)

(52) U.S. Cl.
    CPC ......... *G06Q 20/202* (2013.01); *G06Q 20/204* (2013.01); *G06Q 20/341* (2013.01); *G06Q 20/3825* (2013.01); *G06Q 20/38215* (2013.01); *G06Q 20/405* (2013.01); *G06Q 20/409* (2013.01); *G06Q 20/4012* (2013.01); *G06Q 20/4016* (2013.01); *G06Q 2220/00* (2013.01)

(56) References Cited

U.S. PATENT DOCUMENTS

2007/0208671 A1*   9/2007   Brown ................. G06Q 20/341
                                                                         705/65
2010/0319058 A1    12/2010   Chen \* cited by examiner

METHOD AND DEVICE FOR IMPLEMENTING PASSWORD-FREE EMV CONTACT TRANSACTION

FIELD OF THE INVENTION

The present invention relates to a method for realizing an EMV contact transaction without password and a device therefor, which belongs to the information security field.

PRIOR ART

With popularity of the terminal payment, more and more users would like to use the terminal payment; but, it is not convenient because the user needs to input a password for each payment, that is different from the traditional payment; thus, it becomes a key point how to make it convenient on one hand and how to make sure the security of the terminal payment on the other hand.

In prior art, for a contactless IC card, a user does not need to input a password when the user pay a transaction in the case that a transaction amount is less than a limit; while in the case that the transaction amount is more than the limit, the user needs to input the password; whereas for a contact IC card, it does not have the amount limit function, and it is not convenient for a user to pay a transaction each time.

SUMMARY OF THE INVENTION

The object of the present invention is to provide a method for realizing an EMV contact transaction without password and a device therefor, with which the IC card does not need to be updated and can realize a small amount payment without password, it makes the payment more convenient.

Thus, according to one aspect of the present invention, there is provided a method for realizing an EMV contact transaction without password, comprising:

Step S1, selecting, by a terminal, an application when transaction information is received by the terminal, and setting a without password function;

Step S2, initializing, by the terminal, a current application selected by the terminal, and executing off-line data authentication;

Step S3, executing, by the terminal, a processing limit;

Step S4, determining, by the terminal, whether the current selected application needs a card holder to authenticate PIN code according to a password free function setting, if yes, executing to Step S5; otherwise, executing Step S7;

Step S5, prompting, by the terminal, the card holder to input PIN code information, and determining whether the PIN code information is correct when the PIN code information is received, if yes, executing Step S6; otherwise, reporting an error, and ending the method;

Step S6, executing, by the terminal, a terminal risk management, and executing an action analysis, executing on-line process, executing a transaction ending process;

Step S7, executing, by the terminal, the terminal risk management, and the action analysis;

Step S8, determining, by the terminal, whether the current transaction needs on-line process according to the password free function setting, if yes, executing the on-line process, and executing Step S9; otherwise, executing Step S9; and Step S9, executing, by the terminal, the transaction ending process; and said executing the password free function setting includes:

Step T1, obtaining, by the terminal, a stored selectable kernel configuration in an application parameter which corresponds to the selected current application, and determining whether the selectable kernel configuration is set, if yes, executing Step T2; otherwise, executing Step S2; and Step T2, obtaining, by the terminal, a password free IC card transaction limit in the application parameter corresponding to the current selected application, and determining whether the transaction amount in the transaction information is more than the password free IC card transaction limit, if yes, executing Step S2; otherwise, setting the current application does not need the card holder to authenticate PIN code, and executing Step S2.

According to the other aspect of the present invention, there is provided a device for realizing an EMV contact transaction without password, wherein said device comprises a selecting application module, a password free setting module, an initializing module, an off-line authenticating module, a processing limit module, a first determining module, a prompting to receive module, a second determining module, a risk managing module, an action analyzing module, an on-line processing module, a transaction-ending processing module and a third determining module;

the selecting application module is configured to select an application when the terminal receives transaction information, and to trigger the password free setting module;

the password free setting module is configured to set the password free function, and to trigger the initializing module;

the initializing module is configured to initialize the current application selected by the selecting application module, and to trigger the off-line authenticating module;

the off-line authenticating module is configured to authenticate off-line data, and to trigger the processing limit module;

the processing limit module is configured to operate the processing limit, and to trigger the first determining module;

the first determining module is configured to determine whether the current selected application needs the card holder to authenticate PIN code according to the password free function setting, if yes, trigger the prompting to receive module; otherwise, trigger the risk managing module;

the prompting to receive module is configured to prompt the card holder to input PIN code information and to receive the PIN code information input by the card holder;

the second determining module is configured to determine whether the PIN code information is correct when the prompting to receive module receives the PIN code information input by the card holder, and to trigger the risk managing module in the case that the PIN code information is correct; and to report error in the case that the PIN code information is not correct;

the risk managing module is configured to manage the terminal risk, and to trigger the action analyzing module;

the action analyzing module is configured to analyze an action, and to trigger the on-line processing module or the third determining module;

the on-line processing module is configured to operate the on-line processing, and to trigger the transaction-ending processing module;

the transaction-ending processing module is configured to process the transaction ending; and the third determining module is configured to determine whether the current transaction needs on-line processing according to password free function setting; and to trigger the on-line processing module in the case that the current transaction needs on-line processing; and to trigger the transaction-ending processing module in the case that the current transaction does not need on-line processing; and the password free setting module includes that a first obtaining sub-module which is configured to obtain the stored selectable core configure identification in the application parameter corresponding to the current application which is chosen by the selecting application module;

a first determining sub-module which is configured to determine whether the selectable core configure identification is set, if yes, to trigger a second obtaining sub-module; otherwise, trigger the initializing module;

the second obtaining which is configured to obtain a password free IC card transaction limit in the application parameter corresponding to the current application which is selected by the selecting application module;

a second determining sub-module which is configured to determine whether the transaction amount in the transaction information is more than the password free IC card transaction limit obtained by the second obtaining sub-module, if yes, to trigger the initializing module; otherwise, trigger a first setting sub-module; and the first setting sub-module which is configured to set the current application does not need to authenticate PIN code of the card holder, and to trigger the initializing module.

Compared to the prior art, the present invention has such advantages that after executing the selecting application in the transaction of the contact IC card, the contact IC card compares the transaction amount with a preset limit after the selectable kernel configuration is effective, the current application is set the configuration that it does not need a card holder to authenticate PIN code in the case that the transaction amount is not more than the preset limit, and it does not need the card holder to authenticate PIN code in the whole transaction, in this way, the present invention realizes the transaction without password when the amount is small, thus it becomes more convenient for a user, and the IC card does not need to be updated.

PREFERRED EMBODIMENTS

The technical solution in the Embodiment of the present invention is further described more clearly and completely with the drawings of the present invention. Apparently, Embodiments described herein are just a few Embodiments of the present invention. On the basis of Embodiments of the invention, all other related Embodiments made by those skilled in the art without any inventive work belong to the scope of the invention.

The method in the present Embodiments apply to the following situations including: 1) the stores who needs to provide PIN code free/signature free IC transaction (described as No CVM transaction hereafter) on one hand; and 2) the user needs to confirm whether operate transaction with PIN code or PIN code free transaction in every IC transaction.

Embodiment 1

Figure 1:
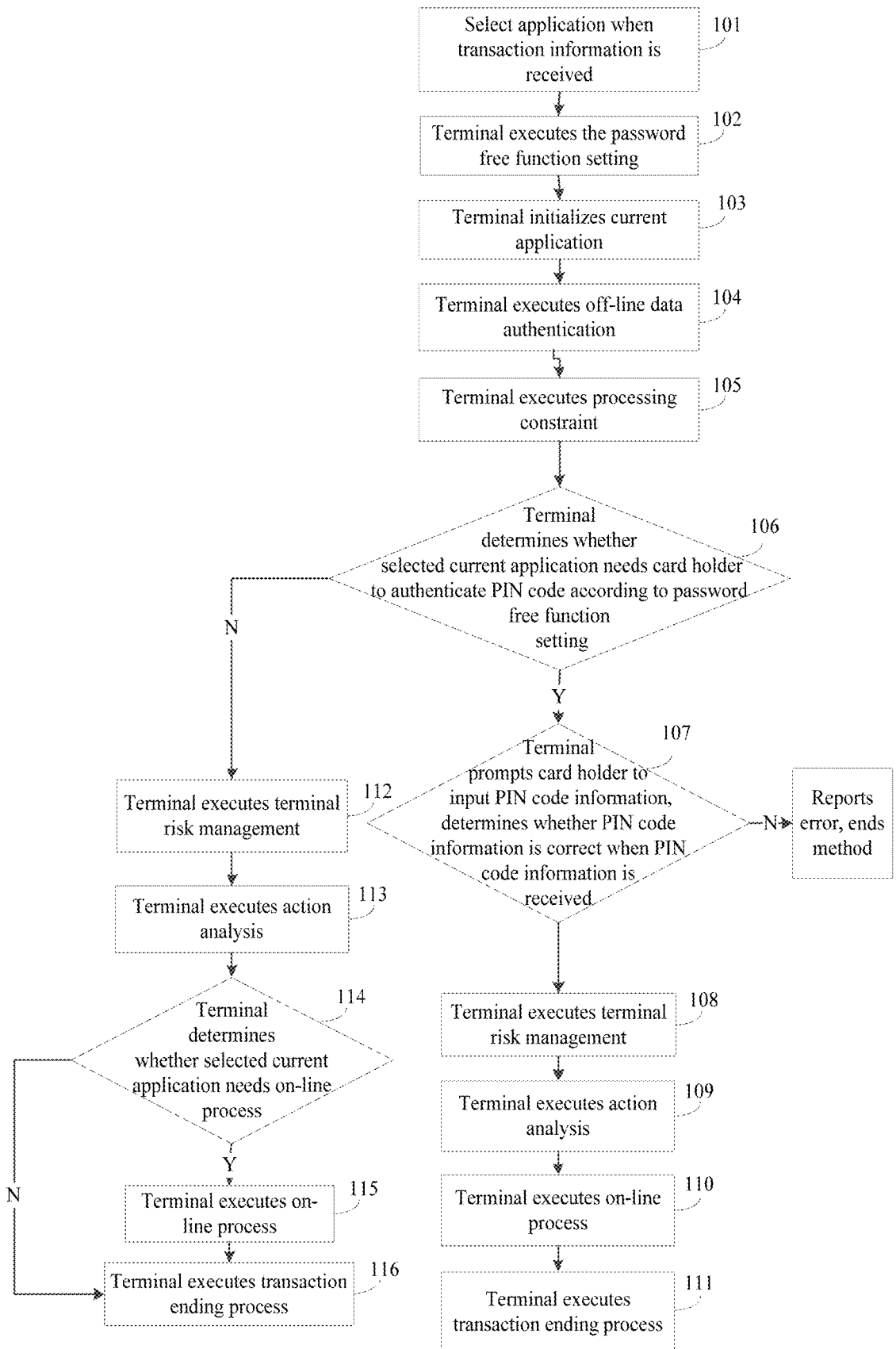
FIG. 1 is a flow diagram of a method for realizing a password free EMV contact transaction according to Embodiment 1 of the present invention.
Figure 2:
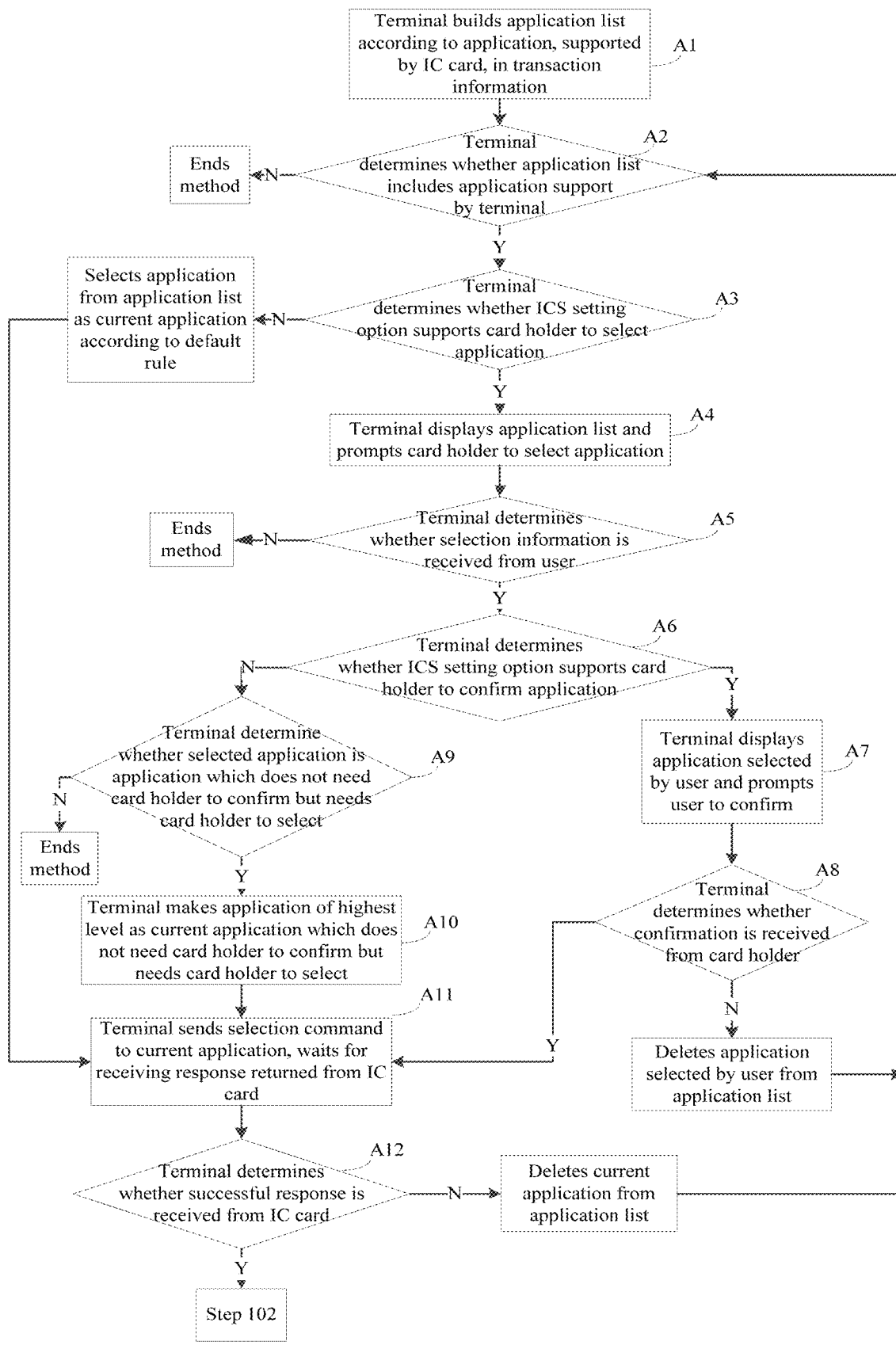
FIG. 2 is a flow diagram of details for selecting application according to Step 101 in Embodiment 1 of the present invention.

It provides a method for realizing EMV contact transaction without a password according to Embodiment 1 of the present invention, as shown in FIG. 1, including:

Step 101, a terminal selects an application when receiving transaction information; Specifically, the transaction information in Embodiment 1 includes a transaction amount, a tax amount and an item code;

In the present Embodiment 1, a process for selecting the application, as show in FIG. 2, includes that Step A1, the terminal builds an application list according to the applications applied to by an IC card in the transaction information;

Step A2, the terminal determines whether there exists an application applied to by the terminal in the application list, if yes, executes Step A3; otherwise ends the method;

Step A3, the terminal determines whether ICS, which is configured to configure a function applied to by the terminal, setting options support the application selected by a card holder, if yes, executes Step A4; otherwise, selects an application from the application list according to a default rule as a current application, and executes Step A11.

For instance, the default rule can be the highest priority level or the lowest priority level;

Step A4, the terminal displays the application list and prompts the card holder to select; Preferably, the terminal displays the application list according to the priority level and prompts the card holder to select;

Step A5, the terminal determines whether selection information is received from the user, if yes, executes Step A6; otherwise, ends the method;

Step A6, the terminal determines whether ICS setting option supports the application confirmed by the card holder, if yes, executes Step A7; otherwise, executes Step A9;

Step A7, the terminal displays the application selected by the user and prompts the card holder to confirm;

Step A8, the terminal determines whether the confirming information is received from the card holder, if yes, executes Step A11; otherwise, deletes the application selected by the user from the application list, and returns to Step A2;

Step A9, the terminal determines whether the application selected is the application which does not need the card holder to confirm and permit the card holder to select, if yes, executes Step A10; otherwise, ends the method;

Step A10, the terminal makes the application of the highest level as the current application which does not need the card holder to confirm but permit the card holder to select, executes Step A11;

Step A11, the terminal sends a selecting instruction to the current application, and waits for receives a response returned from the IC card;

Step A12, the terminal determines whether a successful response returned from the IC card is received, if yes, executes Step 102; otherwise, deletes the current application from the application list, and returns to Step A2;

Step 102, the terminal sets a password free function.

Figure 3:
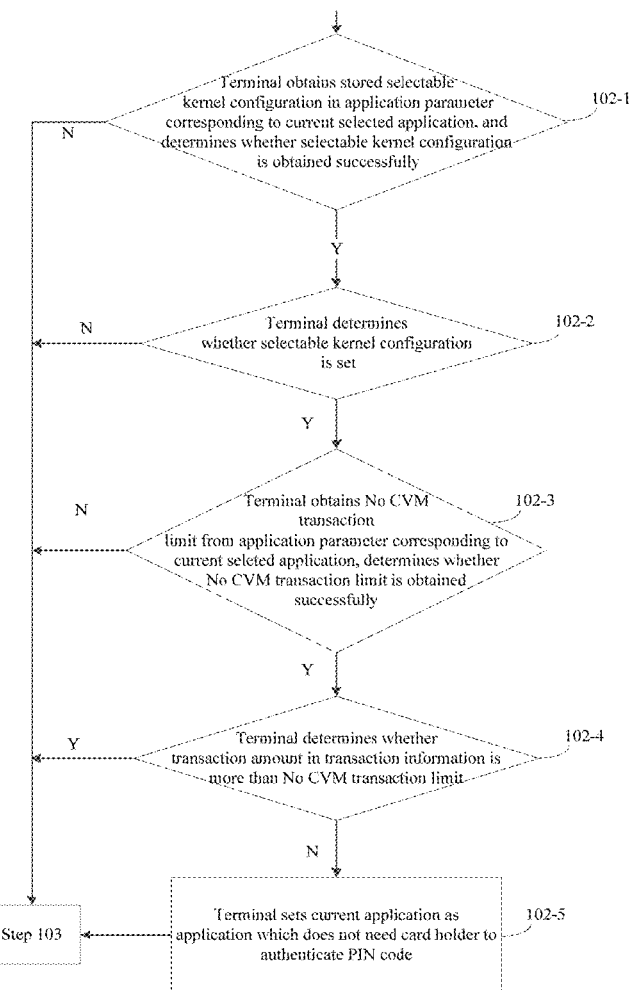
FIG. 3 is a flow diagram of details of Step 102 in Embodiment 1 of the present invention.

Specifically, Step 102 in Embodiment 1, as shown in FIG. 3, comprises

Step 102-1, the terminal obtains the stored selectable kernel configuration (SKC) in the application parameter which corresponds to the selected current application, and determines whether the SKC is obtained successfully, if yes, executes Step 102-2; otherwise, executes Step 103;

Specifically, in Embodiment 1, the application parameter is downloaded in the terminal by a card issuer;

Step 102-2, the terminal determines whether the SKC is set, if yes, executes Step 102-3; otherwise, executes Step 103;

Step 102-3, the terminal obtains a No CVM (password-free IC card transaction limit) transaction limit from the application parameter corresponding to the selected current application, and determines whether the password-free IC card transaction limit is obtained successfully, if yes, executes Step 102-4; otherwise, executes Step 103;

Step 102-4, the terminal determines whether the transaction amount in the transaction information is more than the password-free IC card transaction limit, if yes, executes Step 103; otherwise, executes Step 102-5;

Step 102-5, the terminal sets that the card holder does not need to authenticate the current application PIN code, executes Step 103;

In Embodiment 1, setting that the card holder does not need to authenticate the current application PIN code comprises that sets the off-line PIN code identification and the on-line PIN code identification as a first preset value, sets the password-free IC card transaction identification; optionally, the default value of the off-line PIN code identification and the on-line PIN code identification is a second preset value; for instance, the first preset value is 0, the second preset value is 1.

Figure 4:
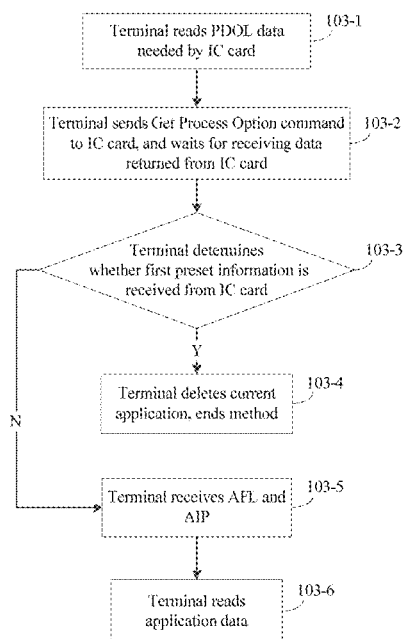
FIG. 4 is a flow diagram of details of Step 103 in Embodiment 1 of the present invention.

Step 103, the terminal initializes the current application;

Specifically, Step 103, as shown in FIG. 4, comprises that

Figure 5:
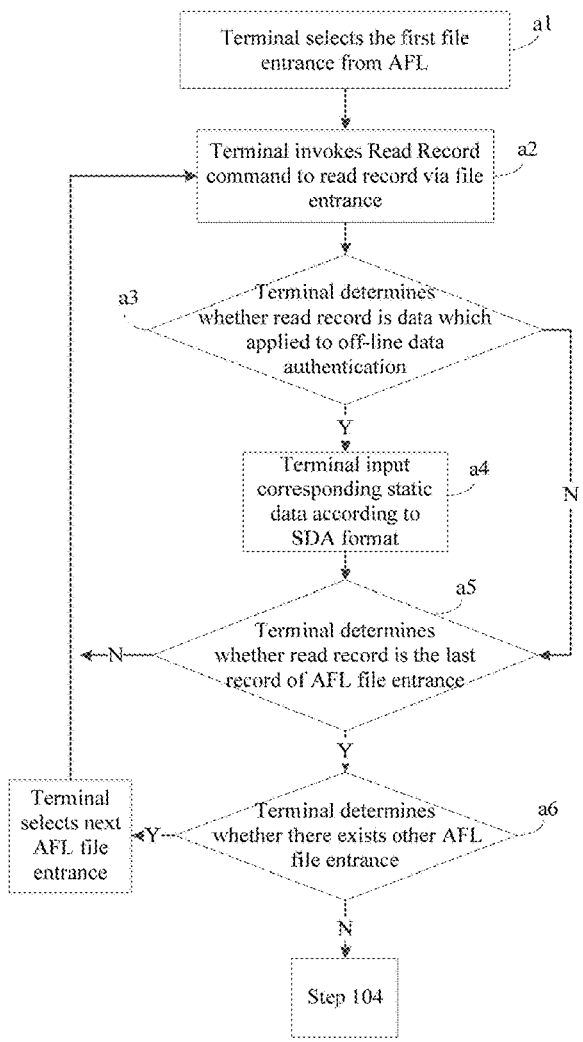
FIG. 5 is a flow diagram of details of Step 103-6 in Embodiment 1 of the present invention.

Step 103-1, the terminal reads Processing Option Data Object List (PDOL) data which is needed by the IC card;

Specifically, in Embodiment 1, PDOL data is a list, the terminal gets information that which data is needed by the IC card via said list;

Step 103-2, the terminal sends a Get Processing Option instruction to the IC card, and waits for receiving data returned from the IC card;

In Embodiment 1, the Get Processing Option instruction includes the PDOL data;

Step 103-3, the terminal determines whether a first preset information returned from the IC card is received, if yes, executes Step 103-4; otherwise, executes Step 103-5;

Specifically, the preset information in Embodiment 1 is using not meet condition information;

Step 103-4, the terminal deletes the current application, and ends the method;

In Embodiment 1, there are multiple applications in the terminal, thus Step 103-4 includes that the terminal deletes the current application from the application list, and reselect an application; details about selecting an application will be given thereafter;

Step 103-5, the terminal receives Application File Locator (AFL) and Application Interchange Profile (AIP);

Step 103-6, the terminal reads the application data;

Specifically, Step 103-6, as shown in FIG. 5, comprises that

Step a1, the terminal selects the first file entrance from AFL;

Step a2, the terminal invokes a Read Record command via the file entrance to read record;

In Embodiment 1, the record which is read includes static data;

Step a3, the terminal determines whether the record which is read is data which is applied to off-line data authentication, if yes, executes Step a4; otherwise, executes Step a5;

Step a4, the terminal inputs corresponding static data according to Static Data Authentication (SDA) format, and executes Step a5;

Step a5, the terminal determines whether the record which is read is the last record of the AFL file entrance, if yes, executes Step a6; otherwise, returns Step a2;

Step a6, the terminal determines whether there exists other AFL file entrance, if yes, selects the next AFL file entrance, and returns to Step a2; otherwise, executes Step 104.

Figure 6:
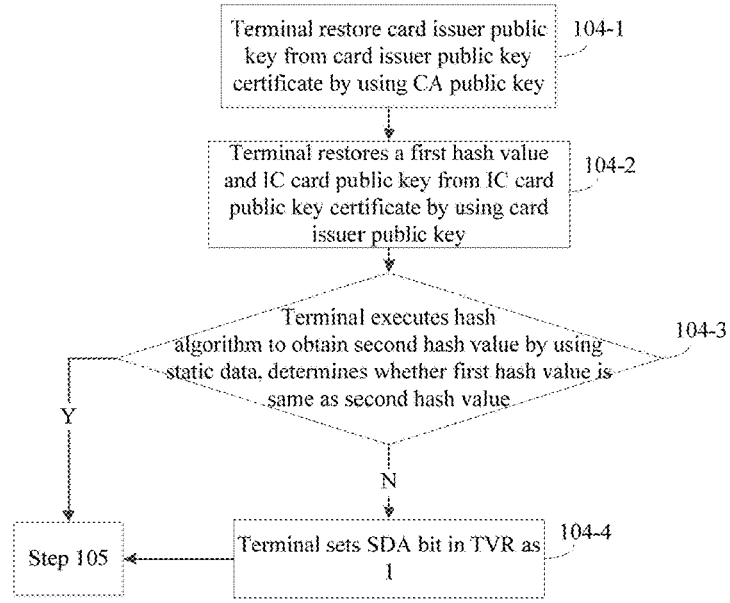
FIG. 6 is a flow diagram of details of Step 104 in Embodiment 1 of the present invention.

Step 104, the terminal operates the off-line data authentication;

Specifically, Step 104, as shown in FIG. 6, comprises that

Step 104-1, the terminal recovers an Issuer Public Key from the issuer public key certificate by using Certificate Authority (CA) public key;

Step 104-2, the terminal uses the Issuer Public Key to recover a first hash value and an IC card public key from the IC card public key certificate;

Step 104-3, the terminal operates hash operation on the static data to obtain a second hash value, and determines whether the first hash value is same as the second hash value, if yes, executes Step 105; otherwise, executes Step 104-4;

Step 104-4, the terminal sets static data authentication (SDA) bit in terminal Verification Results (TVR) as 1, and executes Step 105;

Specifically, before Step 105, Step 104-4 further includes that

Step 104-6, the terminal sends an internal authenticate command and static data to the IC card;

Step 104-7, the terminal receives a dynamic data issuer's signature returned from the IC card, and authenticates the dynamic data issuer's signature by using the IC card public key according to dynamic data, and executes Step 104-8 in the case that the dynamic data issuer's signature is authenticated successfully; executes Step 105 in the case that the dynamic data issuer's signature is authenticated unsuccessfully;

Specifically, in Embodiment 1, authenticating the dynamic data issuer's signature by using the IC card public key includes that the dynamic data issuer's signature is decrypted by using the IC card public key to obtain a third hash value, the dynamic data is operated on hash operation to obtain a fourth hash value, and determines whether the third hash value is same as the fourth hash value, if yes, the dynamic data issuer's signature is authenticated successfully; otherwise, the dynamic data issuer's signature is authenticated unsuccessfully;

Step 104-8, the terminal sets a dynamic data authentication (DDA) bit in TVR as 1, and executes Step 105.

Figure 7:
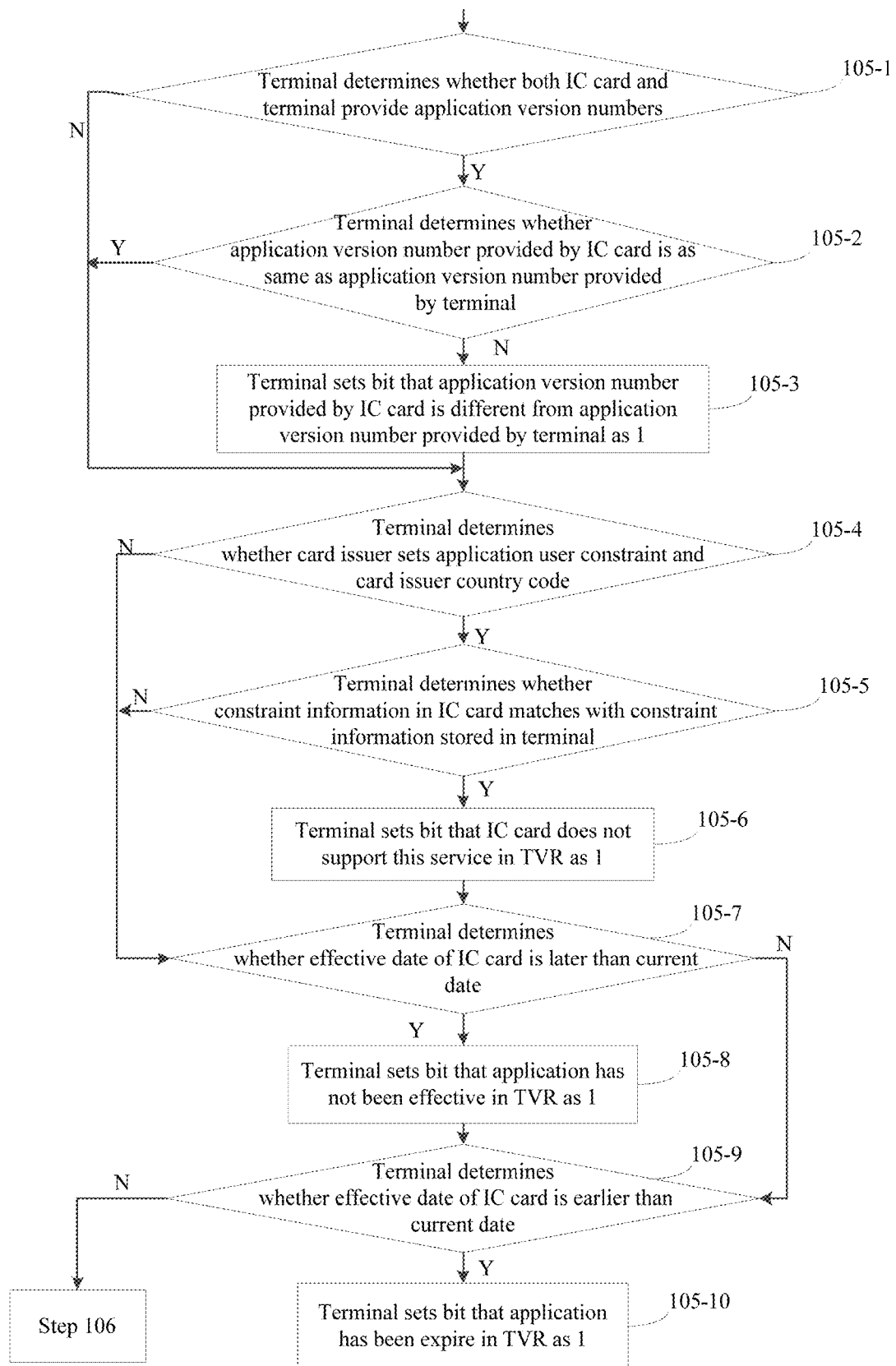
FIG. 7 is a flow diagram of details of Step 105 in Embodiment 1 of the present invention.

Step 105, the terminal processes a processing constraint;
Specifically, Step 105, as shown in FIG. 7, comprises that Step 105-1, the terminal determines whether both the IC card and the terminal provide an application version number, if yes, executes Step 105-2; otherwise, executes Step 105-4;

Step 105-2, the terminal determines whether the application version number provided by the IC card is same as the application version number provided by the terminal, if yes, executes Step 105-4; otherwise, executes Step 105-3;

Step 105-3, the terminal sets the application version numbers provided by the IC card and the terminal are different from each other bit in TVR as 1, executes Step 105-4;

Step 105-4, the terminal determines whether the card issuer sets an application user constraint and a card issuer state code, if yes, executes Step 105-5; otherwise, executes Step 105-7;

Step 105-5, the terminal determines whether constraint information in the IC card matches with constraint information stored in the terminal, if yes, executes Step 105-6; otherwise, executes Step 105-7;

For instance, the constraint information in Embodiment 1 is shown in a bellow table:

| Transaction type | Card issuer state code | Constraint information |
| --- | --- | --- |
| Cash transaction | Match terminal state code | Domestic cash transaction valid |
|  | Not match terminal state code | International cash transaction valid |
| Consumption transaction (product or service) | Match terminal state code | Domestic product valid and/or domestic service valid |
|  | Not match terminal state code | International product valid and/or international service valid |
| Return cash in transaction | Match terminal state code | Permit domestic return cash |
|  | Not match terminal state code | Permit international return cash |

Step 105-6, the terminal sets the bit that IC card does not support the service in TVR as 1, executes Step 105-7;

Step 105-7, the terminal determines whether an IC card effective date is later than the current date, if yes, executes Step 105-8; otherwise, executes Step 105-9;

Step 105-8, the terminal sets a bit that application has not effective in TVR as 1, and executes Step 105-9;

Step 105-9, the terminal determines whether the IC card effective data is earlier than the current date, if yes, executes Step 105-10; otherwise, executes Step 106;

Step 105-10, the terminal sets a bit that application is expired in TVR as 1, executes Step 106.

Step 106, the terminal determines whether the selected current application needs the card holder to authenticate PIN code according to the password-free function setting, if yes, executes Step 107; otherwise, executes Step 112.

Step 107, the terminal prompts the card holder to input PIN code information, and determines whether the PIN code information is correct when the PIN code information is received, if yes, executes Step 108; otherwise, reports an error, and ends the method.

Step 108, the terminal operates the terminal risk management that means checking whether the transaction amount is more than the lowest limit.

Figure 8:
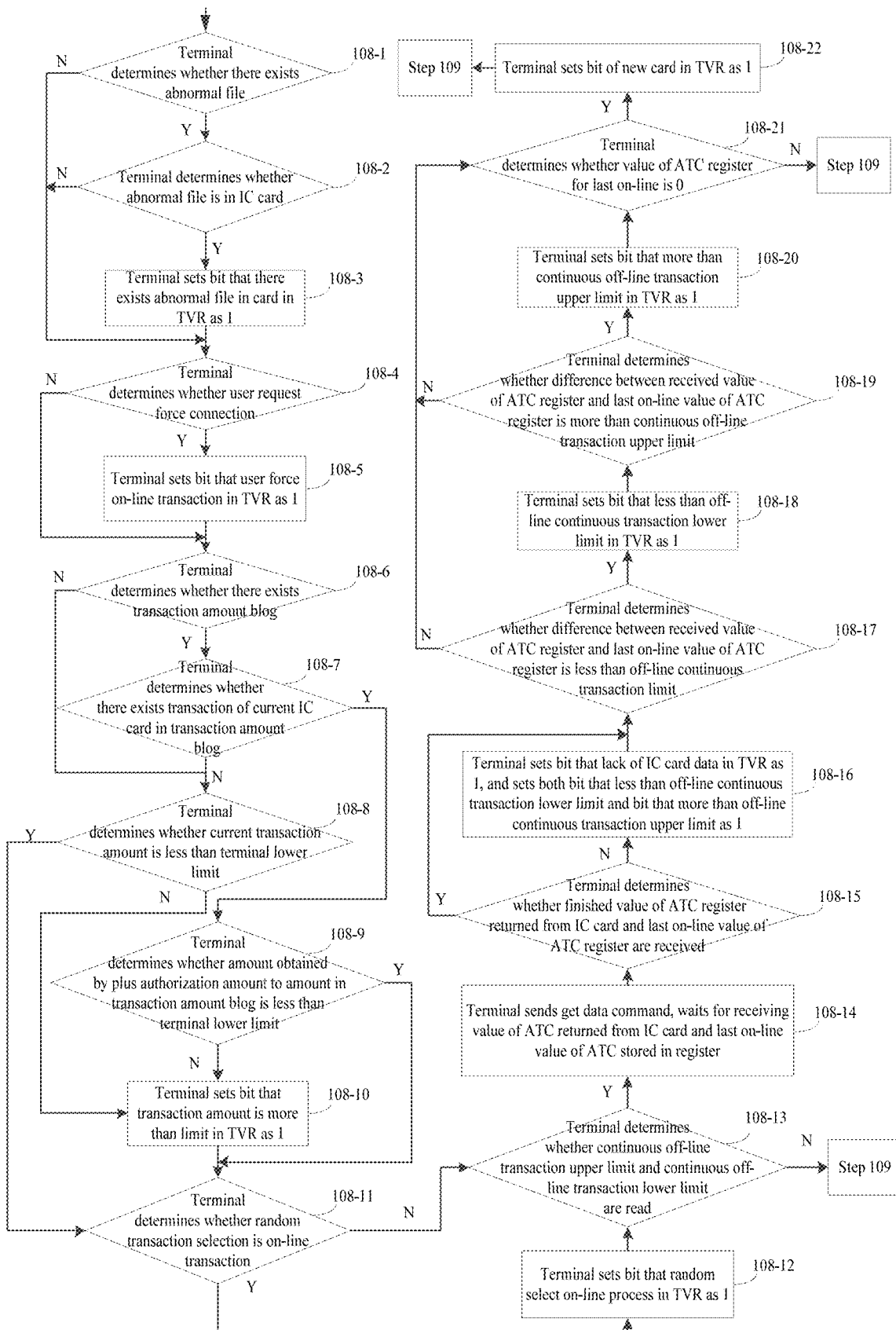
FIG. 8 is a flow diagram of details of Step 108 in Embodiment 1 of the present invention.

Specifically, Step 108, as shown in FIG. 8, includes that

Step 108-1, the terminal determines whether there exists abnormal file, if yes, executes Step 108-2; otherwise, executes Step 108-4;

Step 108-2, the terminal determines whether the abnormal file is in the current IC card, if yes, executes Step 108-3; otherwise, executes Step 108-4;

Step 108-3, the terminal sets a bit that there is abnormal file in the card in TVR as 1, and executes Step 108-4;

Step 108-4, the terminal determines whether the user requires forced connection, if yes, executes Step 108-5; otherwise, executes Step 108-6; Specifically, Step 108-4 is that the terminal determines whether there exists forced online TLV data, if yes, requires forced connection; otherwise, forced connection is not required.

Step 108-5, the terminal sets a bit that the user forces online transaction in TVR as 1, executes Step 108-6;

Step 108-6, the terminal determines whether there exists a transaction amount blog, if yes, executes Step 108-7; otherwise, executes Step 108-8;

Step 108-7, the terminal determines whether there exists a transaction of the current IC card in the transaction amount blog, if yes, executes Step 108-9; otherwise, executes Step 108-8;

Step 108-8, the terminal determines whether the current transaction amount is less than the lowest limit of the terminal, if yes, executes Step 108-11; otherwise, executes Step 108-10;

Step 108-9, the terminal determines whether the amount obtained by plus an authorized amount on an amount of the transaction amount blog is less than the lowest limit of the terminal, if yes, executes Step 108-11; otherwise, executes Step 108-10;

Step 108-10, the terminal sets a bit that transaction amount is more than the limit in TVR as 1, and executes Step 108-11;

Step 108-11, the terminal determines whether random transaction selection is the online transaction, if yes, executes Step 108-12; otherwise, executes Step 108-13;

Step 108-12, the terminal sets a bit that random select online process in TVR as 1, and executes Step 108-13;

Step 108-13, the terminal determines whether an upper limit and a lower limit of the continuous offline transaction is read, if yes, executes Step 108-14; otherwise, executes Step 109;

Step 108-14, the terminal sends GET DATA command to the IC card, waits for receiving an application transaction counter (ATC) returned from the IC card and a value which stored in a register during the last time online ATC;

Step 108-15, the terminal determines whether the ATC returned from the IC card and the value of the register during the last time online ATC are received, if yes, executes Step 108-17; otherwise, executes Step 108-16;

Step 108-16, the terminal sets a bit that lack IC card data in TVR as 1, and sets both the bit that more than offline continuous transaction lower limit in TVR and the bit that more than offline continuous transaction upper limit as 1, and executes Step 108-17;

Step 108-17, the terminal determines whether a difference between the value of the received ATC and the value of register during the last time online ATC is more than the offline continuous transaction lower limit, if yes, executes Step 108-18; otherwise, executes Step 108-21;

Step 108-18, the terminal sets a bit that less than the offline continuous transaction lower limit in TVR as 1, and executes Step 108-19;

Step 108-19, the terminal determines whether the difference between the value of the received ATC and the value of register during the last time online ATC is more than the offline continuous transaction upper limit, if yes, executes Step 108-20; otherwise, executes Step 108-21;

Step 108-20, the terminal sets a bit that more than the offline continuous transaction lower limit in TVR as 1, and executes Step 108-21;

Step 108-21, the terminal determines whether the value of ATC register during the last time connection is 0, if yes, executes Step 108-22; otherwise, executes Step 109;

Step 108-22, the terminal sets a bit of new card in TVR as 1, and executes Step 109.

Step 109, the terminal operates the action analysis.

Figure 9:
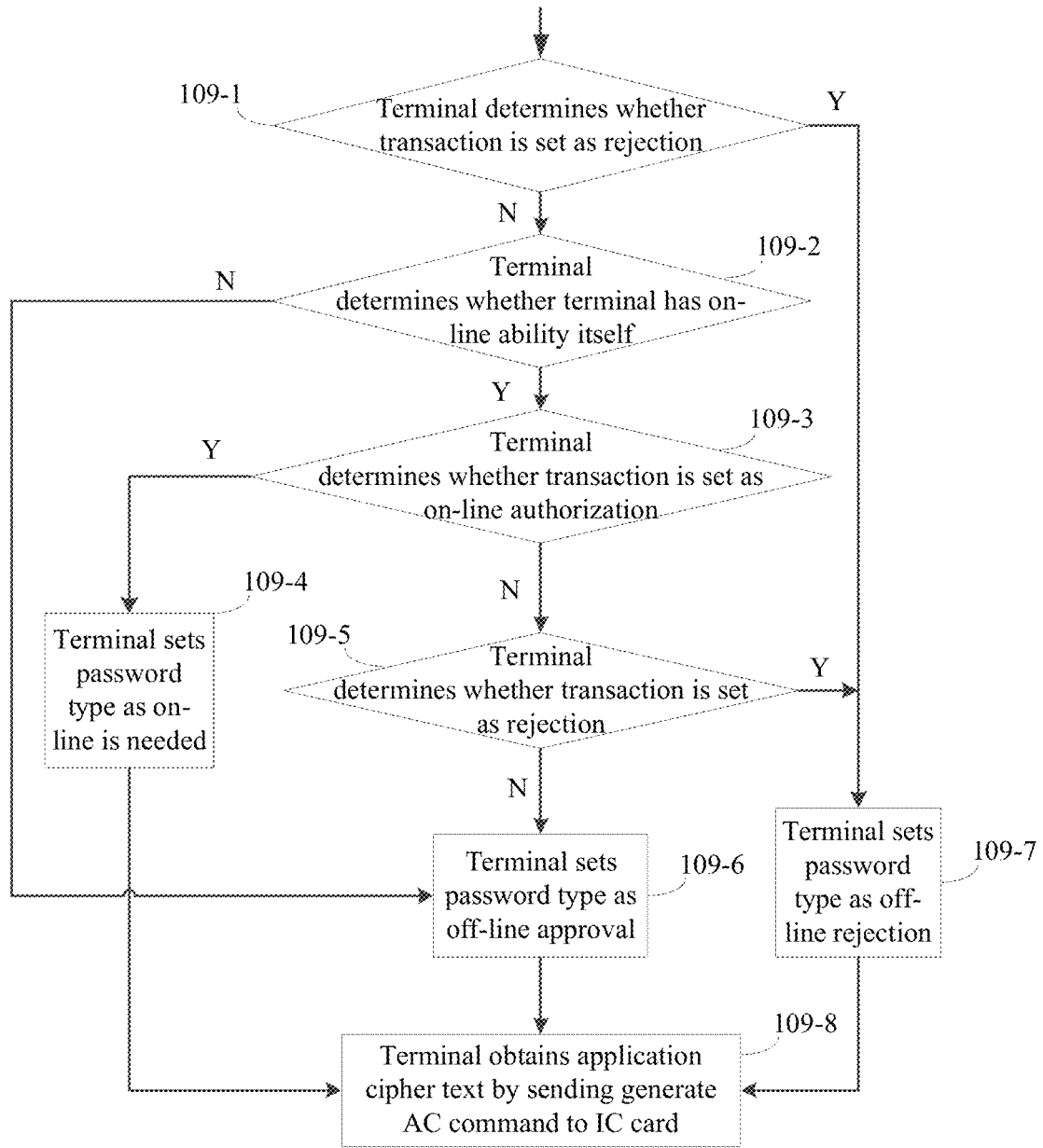
FIG. 9 is a flow diagram of details of Step 109 in Embodiment 1 of the present invention.

Specifically, Step 109, as shown in FIG. 9, comprises:

Step 109-1, the terminal determines whether the transaction is set as reject, if yes, executes Step 109-7; otherwise, executes Step 109-2;

Step 109-2, the terminal determines whether it can online itself, if yes, executes Step 109-3; otherwise, executes Step 109-6;

Step 109-3, the terminal determines whether the transaction is set as an online authentication, if yes, executes Step 109-4; otherwise, executes Step 109-5;

Step 109-4, the terminal sets a password type as online required, and executes Step 109-8;

Step 109-5, the terminal determines whether the transaction is set as reject, if yes, executes Step 109-7; otherwise, executes Step 109-6;

Step 109-6, the terminal sets the password type as offline permit, and executes Step 109-8;

Step 109-7, the terminal sets the password type as offline reject, and executes Step 109-8;

Step 109-8, the terminal obtains application cipher text by sending generate AC command to the IC card.

Figure 10:
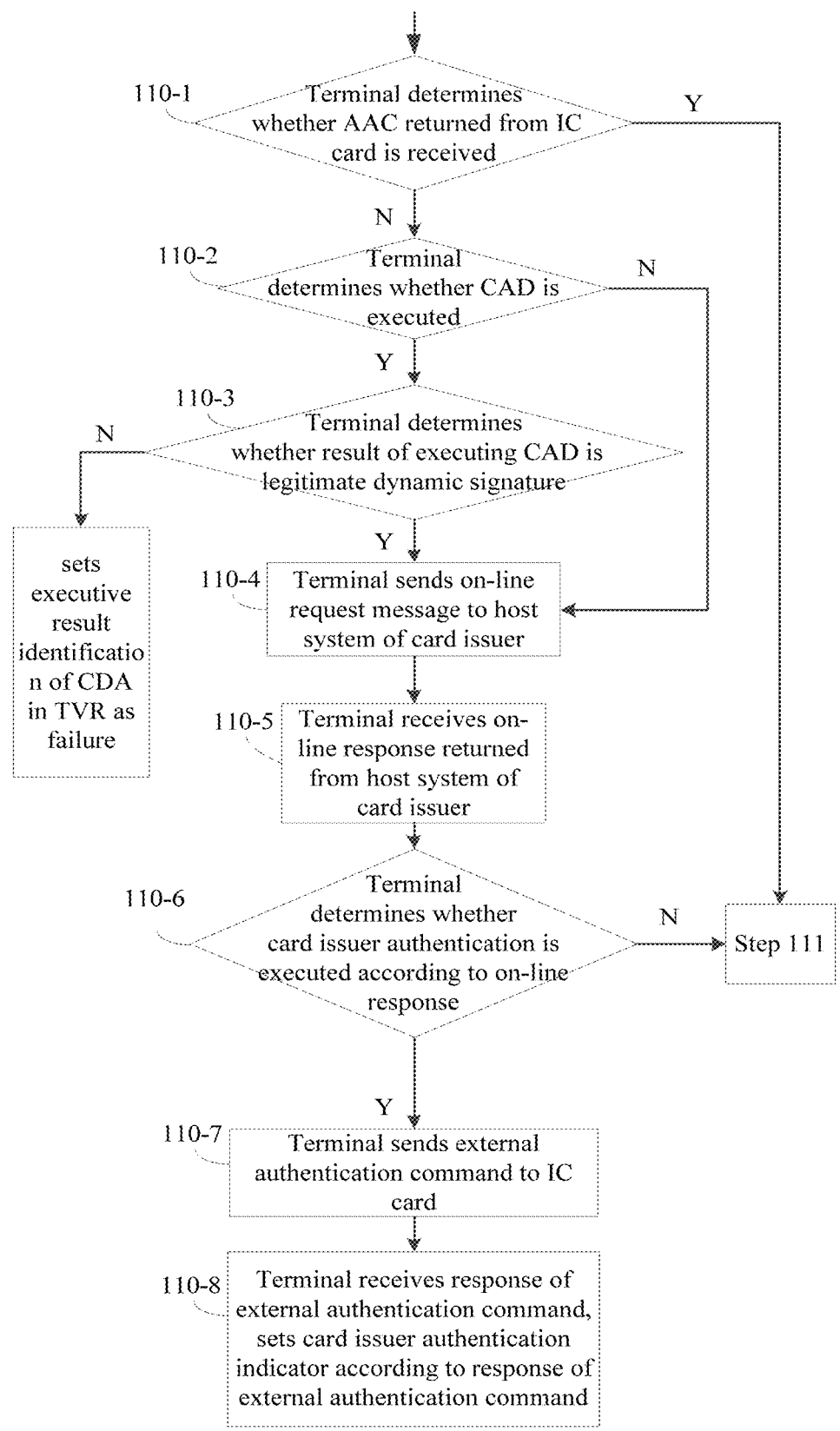
FIG. 10 is a flow diagram of details of Step 110 in Embodiment 1 of the present invention.

Step 110, the terminal operates online process,

Specifically, Step 110, as shown in FIG. 10, includes that

Step 110-1, the terminal determines whether an application authentication cryptogram (AAC) returned from the IC card is received, if yes, executes Step 111; otherwise, executes Step 110-2;

Step 110-2, the terminal determines whether a Combined DDA/AC Generation (CDA) is operated, if yes, executes Step 110-3; otherwise, executes Step 110-4;

Step 110-3, the terminal determines whether executive result of CDA is a legitimate dynamic signature, if yes, executes Step 110-4; otherwise, sets executive result identification of CDA in TVR as failure;

Step 110-4, the terminal sends an online request message to a host system of the card issuer;

Step 110-5, the terminal receives an online response from the host system of the card issuer;

Step 110-6, the terminal determines whether card issuer authentication is executed according to the online response, if yes, executes Step 110-7; otherwise, executes Step 111;

Step 110-7, the terminal sends an external authentication command to the IC card;

Step 110-8, the terminal receives a response of the external authentication command, and sets a card issuer authentication indicator according to the received response of the external authentication command.

Step 111, the terminal operates a transaction end process.

Figure 11:
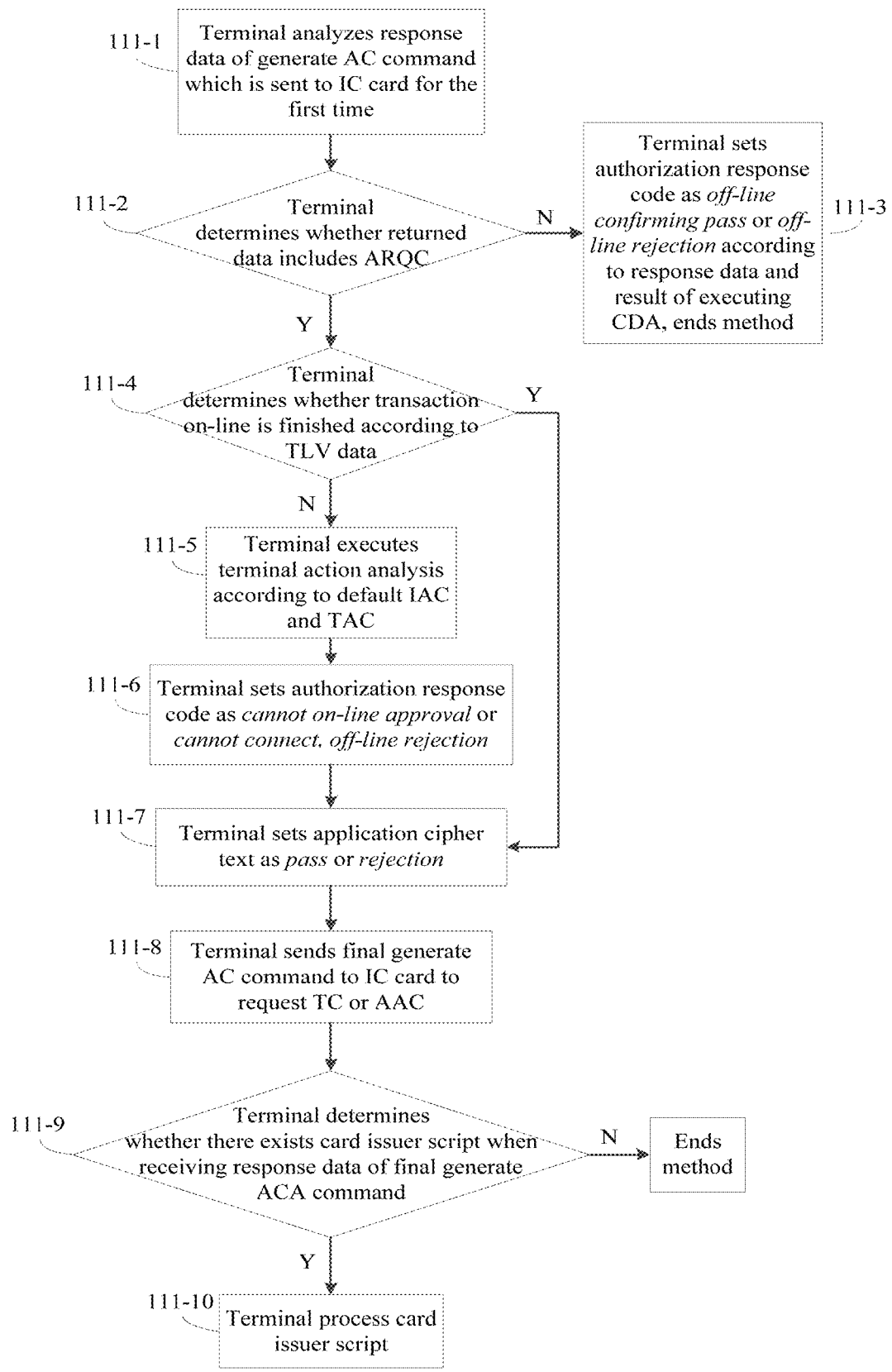
FIG. 11 is a flow diagram of details of Step 111 in Embodiment 1 of the present invention.

Specifically, Step 111, as shown in FIG. 11, comprises that

Figure 12:
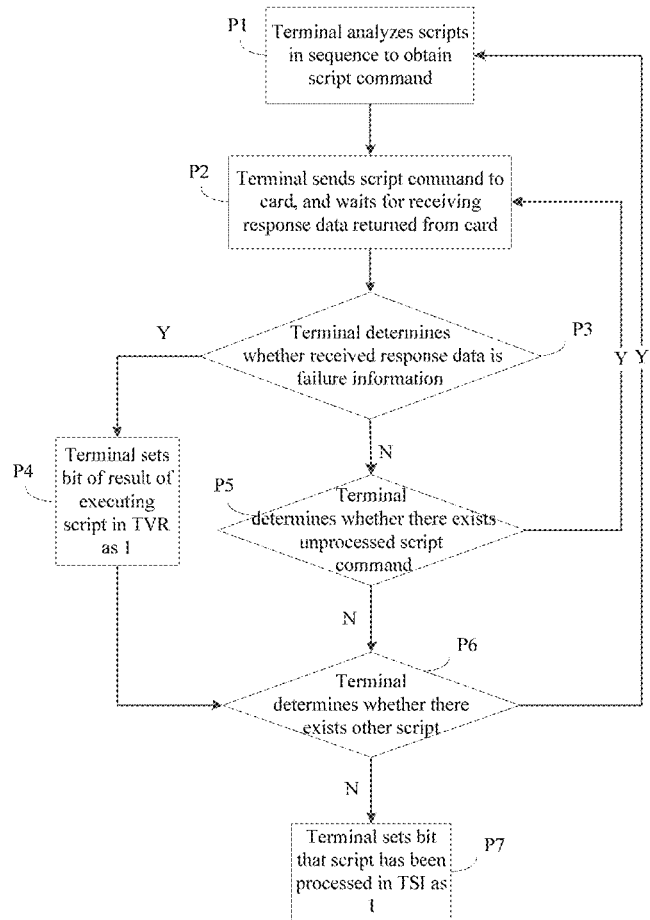
FIG. 12 is a flow diagram of details of Step 111-10 in Embodiment 1 of the present invention.

Step 111-1, the terminal analyses response data of the Generate AC command which is sent to the IC card for the first time;

Step 111-2, the terminal determines whether the returned data includes authorization request cryptogram (ARQC), if yes, executes Step 111-4; otherwise, executes Step 111-3;

Step 111-3, the terminal sets the authorization response code as offline confirm pass or offline reject according to the response data and CDA, ends the method;

Step 111-4, the terminal determines whether the transaction connection is finished according to tag length value (TLV) data, if yes, executes Step 111-7; otherwise, executes Step 111-5;

Step 111-5, the terminal executes the terminal action analysis by using default issuer action code (IAC) and terminal action code (TAC);

Step 111-6, the terminal sets the authorization response code as cannot online permit or cannot connection, offline reject, and executes Step 111-7;

Step 111-7, the terminal sets the application cipher text as pass or reject;

Step 111-8, the terminal sends a final generate AC command transaction certificate (TC) or application authentication cryptogram (AAC) to the IC card;

Step 111-9, the terminal determines whether there exists a card issuer script when receiving the response data of the final Generate AC command, if yes, executes Step 111-10; otherwise, ends the method;

Step 111-10, the terminal processes the card issuer script;

In Embodiment 1, as shown in FIG. 12, Step 111-10 specifically includes that

Step P1, the terminal analyses the script in sequence to obtain a script command;

Step P2, the terminal sends the script command to the IC card, and waits for receiving the response data returned from the IC card;

Step P3, the terminal determines whether the response data received is failure information, if yes, executes Step P4; otherwise, executes Step P5;

Step P4, the terminal sets a script processing result bit in TVR as 1, and executes Step P6;

Step P5, the terminal determines whether there exists script command which is not processed, if yes, returns to Step P2; otherwise, executes Step P6;

Step P6, the terminal determines whether there exists other script, if yes, returns to Step P1; otherwise, executes Step P7;

Step P7, the terminal sets a script processed bit in transaction status information (TSI) as 1.

Step 112, the terminal operates the terminal risk management.

In Embodiment 1, the process in Step 112 is just the same as that in Step 108, thus more details will not be given herein;

Step 113, the terminal operates the action analysis.

In Embodiment 1, the process in Step 113 is just the same as that in Step 109, thus more details will not be given herein.

Step 114, the terminal determines whether the current transaction selected needs to operate online process, if yes, executes Step 115; otherwise, executes Step 116.

Step 115, the terminal operates online process.

In Embodiment 1, the process in Step 115 is just the same as that in Step 110, thus more details will not be given herein;

Step 116, the terminal operates the transaction ending process;

In Embodiment 1, the process in Step 116 is just the same as that in Step 111, thus more details will not be given herein.

Embodiment 2

Figure 13:
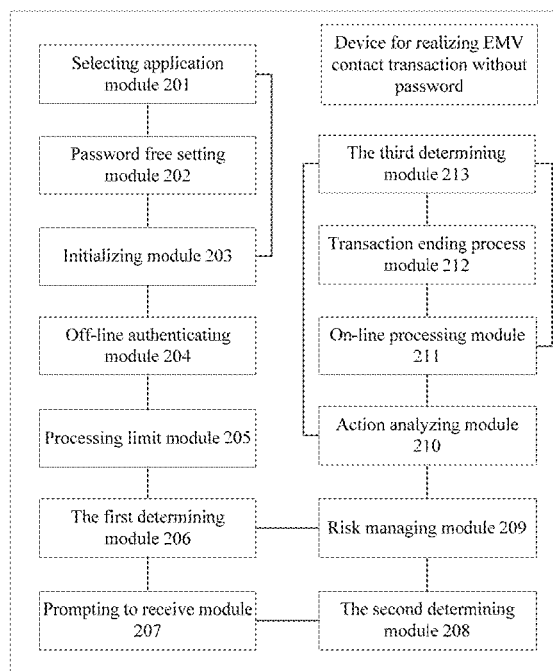
FIG. 13 is a block diagram of a device for realizing a password free EMV contact transaction according to Embodiment 2 of the present invention.

It provides an equipment for realizing a password-free EMV contact transaction according to Embodiment 2 of the present invention, as shown in FIG. 13, comprises a selecting application module 201, a password-free setting module 202, an initializing module 203, an offline authenticating module 204, a processing limit module 205, a first determining module 206, a prompting to receive module 207, a second determining module 208, a risk managing module 209, an action analyzing module 210, an online processing module 211, a transaction ending process module 212 and a third determining module 213;

the selecting application module 201 is configured to select an application in the case that the terminal receives transaction information, and to trigger the password-free setting module 202;

the password-free setting module 202 is configured to set a password-free function, and to trigger the initializing module 203;

the initializing module 203 is configured to initialize the current application selected by the selecting application module 201, and to trigger the offline authenticating module 204;

the offline authenticating module 204 is configured to authenticate offline data, and to trigger the processing limit module 205;

the processing limit module 205 is configured to operate processing limit, and to trigger the first determining module 206;

the first determining module 206 is configured to determine whether the current application needs a card holder to authenticate PIN code according to a password-free function setting, if yes, to trigger the prompting to receive module 207; otherwise, to trigger the risk managing module 209;

the prompting to receive module 207 is configured to prompt the card holder to input PIN code information and to receive the PIN code information input by the card holder;

the second determining module 208 is configured to determine whether the PIN code information is correct when the prompting to receive module 207 receive the PIN code information input by the card holder, and to trigger the risk managing module 209 in the case that the PIN code information is correct; to report an error in the case that the PIN code information is not correct;

the risk managing module 209 is configured to manage the terminal risk, and to trigger the action analyzing module 210;

the action analyzing module 210 is configured to operate action analysis, and to trigger the online processing module 211 or the third determining module 213;

the online processing module 211 is configured to operate online process, and to trigger the transaction ending process module 212;

the transaction ending process module 212 is configured to operate transaction ending process; and the third determining module 213 is configured to determine whether the current transaction needs the online process according to the password-free function setting, and to trigger the online processing module 211 in the case that the current transaction needs the online process; otherwise, to trigger the transaction ending process module 212.

Specifically, the password-free setting module 202 in Embodiment 2 includes that a first obtaining sub-module which is configured to obtain a stored selectable kernel configuration in an application parameter corresponding to the current application which is selected by the selecting application module 201;

a first determining sub-module which is configured to determine whether the selectable kernel configuration obtained by the first obtaining sub-module is set, to trigger a second obtaining sub-module in the case that the selectable kernel configuration is set; otherwise, to trigger the initializing module 203;

the second obtaining sub-module which is configured to obtain a password-free IC card transaction limit in the application parameter corresponding to the current application selected by the selecting application module 201;

the second determining sub-module which is configured to determine whether a transaction amount in the transaction information is more than the password-free IC card transaction limit obtained by the second obtaining sub-module, and to trigger the initializing module 203 in the case that the transaction amount in the transaction information is more than the password-free IC card transaction limit obtained by the second obtaining sub-module; otherwise, to trigger a first setting sub-module;

the first setting sub-module which is configured to set that the current application does not need the card holder to authenticate PIN code, and to trigger the initializing module 203.

In Embodiment 2, the first setting sub-module is specifically configured to set the offline PIN code identification and the online PIN code identification as a first preset value, and to set the password-free IC card transaction identification, and to trigger the initializing module 203.

Correspondingly, the first determining module 206 is specifically configured to determine whether the offline PIN code identification and the online PIN code identification are the first preset value, and whether the password-free IC card transaction identification is set, the card holder does not need to authenticate PIN code in the case that the offline PIN code identification and the online PIN code identification are the first preset value, and the password-free IC card transaction identification is set; and to trigger the risk managing module 209; otherwise, to trigger the prompting to receive module 207.

Specifically, the selecting application module 201 in Embodiment 2 includes that a first building sub-module which is configured to build an application list according to the application, supported by the IC card, in the transaction information;

a third determining sub-module which is configured to determine whether the application list built by the first building sub-module includes an application which can be supported by the terminal, to trigger a fourth determining sub-module in the case that the application list includes the application supported by the terminal; otherwise, to end the method;

the fourth determining sub-module which is configured to determine whether a setting option supports the card holder to select an application, and to trigger a first displaying prompting sub-module in the case that the setting option supports the card holder to select application; otherwise, to trigger a first selecting sub-module;

the first selecting sub-module which is configured to select an application from the application list built by the first building sub-module according to a default rule, and to trigger the first sending sub-module;

the first displaying prompting sub-module which is configured to display the application list built by the first building sub-module and prompt the card holder to select an application, and to trigger a fifth determining sub-module;

the fifth determining sub-module is configured to determine whether selecting information from the user is received, to trigger the sixth determining sub-module in the case that the selecting information is received; otherwise, to end the method;

a sixth determining sub-module which is configured to determine whether the setting option supports the card holder to confirm the application, and to trigger a second displaying and prompting sub-module in the case that the setting option supports the card holder to confirm the application; otherwise, to trigger an eighth determining sub-module;

the second displaying and prompting sub-module which is configured to display the application selected by the user and prompt the card holder to confirm, and to trigger a seventh determining sub-module;

the seventh determining sub-module which is configured to determine whether confirming information is received from the card holder, and to trigger the first sending sub-module in the case that the confirming information is received from the card holder; otherwise, to trigger a first deleting sub-module;

the first deleting sub-module which is configured to delete the application selected by the user from the application list built by the first building sub-module, and to trigger the third determining sub-module;

an eighth determining sub-module which is configured to determines whether the selected application is the application which does not need to be confirmed but which is selected by the card holder needs to be permitted, if yes, to trigger a first acting sub-module; otherwise, to end the method;

the first acting sub-module which is configured to use the application of highest-level as the current application which does not need to be confirmed by the card holder but which is selected by the card holder is permitted, to trigger the first sending sub-module;

the first sending sub-module which is configured to send a selecting command to the current application;

a first receiving sub-module which is configured to wait for receiving a response returned from the IC card;

a ninth determining sub-module which is configured to determine whether a successful response is received by the first receiving sub-module from the IC card, and to trigger the password-free setting module 202 in the case that the successful response is received; otherwise, to trigger a second deleting sub-module; and the second selecting sub-module which is configured to delete the current application from the application list built by the first building sub-module, and to trigger the third determining sub-module.

Specifically, the initializing module 203 in Embodiment 2 comprises that a first reading sub-module which is configured to read data, which is needed by the IC card, from a processing option data object list;

a second sending sub-module which is configured to send the getting process option command to the IC card;

s second receiving sub-module which is configured to wait for receiving data returned from the IC card;

a tenth determining sub-module which is configured to determine whether the second receiving sub-module receives a first preset information returned from the IC card, if yes, to trigger a third deleting sub-module; otherwise, to trigger a third receiving sub-module;

the third deleting sub-module which is configured to delete the current application;

the third receiving sub-module which is configured to receiving an application file locator and an application interchange profile; and a second reading sub-module which is configured to read application data.

In Embodiment 2, the second reading sub-module comprises that a first selecting unit which is configured to select the first file entrance from the application file locator;

a first reading unit which is configured to read a record via the file entrance;

a first determining unit which is configured to determine whether the record read by the first reading unit is data which is applied to offline data authentication, if yes, to trigger an inputting unit; otherwise, to trigger a second determining unit;

the inputting unit which is configured to input corresponding static data according to a static data authenticating format, and to trigger the second determining unit;

the second determining unit which is configured to determine whether the record read by the first reading unit is the last one in the file entrance of the application file locator, if yes, to trigger a third determining unit; otherwise, to trigger the first reading unit;

the third reading unit which is configured to determine whether there exists other file entrance of the application file locator, if yes, to trigger a second selecting unit; otherwise, to trigger the offline authenticating module 204; and the second selecting unit which is configured to select the next file entrance of the application file locator, and trigger the first reading unit.

Specifically, in Embodiment 2, the offline authenticating module 204 includes that a first restoring sub-module which is configured to restore a card issuer public key from a card issuer public key certificate by using a CA public key;

a second restoring sub-module which is configured to restore a first hash value and an IC card public key from the IC card public key certificate by using the card issuer public key restored by the first restoring sub-module;

a hash determining sub-module which is configured to operate hash algorithm on the static data to obtain a second hash value, and determine whether the first hash value is equal to the second hash value, if yes, to trigger the processing limit module 205; otherwise, to trigger a first setting sub-module; and the first setting sub-module which is configured to set static data authenticating identification, and trigger the processing limit module 205.

Specifically, in Embodiment 2, the offline authenticating module 204 comprises that a fourth sending sub-module which is configured to send an internal authenticating command and dynamic data to the IC card in the case that the hash determining sub-module determines that the first hash value is equal to the second hash value;

a fourth receiving sub-module which is configured to receive a dynamic data signature returned from the IC card;

a first authenticating sub-module which is configured to authenticate the dynamic data signature by using the IC card public key according to the dynamic data received by the fourth receiving sub-module, to trigger a second setting sub-module in the case that the dynamic data signature is authenticated successfully; otherwise, to trigger the processing limit module 205; and the second setting sub-module which is configured to set the dynamic data authenticating identification, and trigger the processing limit module 205.

Specifically, in Embodiment 2, the processing limit module 205 includes that an eleventh determining sub-module which is configured to determine whether both the IC card and the terminal provides application version numbers, if yes, to trigger a twelfth determining sub-module; otherwise, to trigger a thirteenth determining sub-module;

the twelfth determining sub-module which is configured to determine whether the application version number provided by the IC card is just the same as the version number provided by the terminal, if yes, to trigger the thirteenth determining sub-module; otherwise, to trigger a third setting sub-module;

the third setting sub-module which is configured to set the identification that the version number of the IC card is different from the version number of the terminal, and to trigger the thirteenth determining sub-module;

the thirteenth determining sub-module which is configured to determine whether the card issuer sets application user constraint and card issuer state code, if yes, to trigger a fourteenth determining sub-module; otherwise, to trigger the fifteenth determining sub-module;

the fourteenth determining sub-module which is configured to determine whether constraint information in the IC card matches with constraint information stored in the terminal, if yes, to trigger a fourth setting sub-module; otherwise, to trigger the fifteenth determining sub-module;

the fourth setting sub-module which is configured to set a bit that the IC card does not support current service, and to trigger the fifteenth determining sub-module;

the fifteenth determining sub-module which is configured to determine whether an effective date of IC card is later than the current date, if yes, to trigger a fifth setting sub-module; otherwise, to trigger a sixteenth determining sub-module;

the fifth setting sub-module which is configured to set a bit that application has not come into effect, and trigger the sixteenth determining sub-module;

the sixteenth determining sub-module which is configured to determine whether the effective date of the IC card is earlier than the current date, if yes, to trigger a sixth setting sub-module; otherwise, to trigger the first determining module 206; and the sixth setting sub-module which is configured to set a bit that application is expired, and trigger the first determining module 206.

Specifically, in Embodiment 2, the risk managing module 209 includes that a seventeenth determining sub-module which is configured to determine whether there exists abnormal file, if yes, to trigger an eighteenth determining sub-module; otherwise, to trigger the eighteenth determining sub-module;

the eighteenth determining sub-module which is configured to determine whether the abnormal file is in the current IC card, if yes, to trigger a seventh setting sub-module; otherwise, to trigger the eighteenth determining sub-module;

the seventh setting sub-module which is configured to set identification that the card is in abnormal file, and to trigger the eighteenth determining sub-module;

the eighteenth determining sub-module which is configured to determine whether the user requests forced connection, if yes, to trigger an eighth setting sub-module; otherwise, to trigger a nineteenth determining sub-module;

the eighth setting sub-module which is configured to set identification that the user forces to online transaction, and to trigger a nineteenth determining sub-module;

the nineteenth determining sub-module which is configured to determine whether there exists transaction account blog, if yes, to trigger a twentieth determining sub-module; otherwise, to trigger a twenty-first determining sub-module;

the twentieth determining sub-module which is configured to determine whether the transaction account blog includes transaction of the current IC card, if yes, to trigger a twenty-second determining sub-module; otherwise, to trigger the twenty-first determining sub-module;

the twenty-first determining sub-module which is configured to determine whether the current transaction amount is less than the lowest limit of the terminal, if yes, to trigger a twenty-third determining sub-module; otherwise, to trigger a ninth setting sub-module;

the twenty-second determining sub-module which is configured to determine whether the sum of the authorized amount and the amount in the transaction account blog is less than the lowest limit of the terminal, if yes, to trigger the twenty-third sub-module; otherwise, to trigger the ninth setting sub-module;

the ninth setting sub-module which is configured to set a bit that the transaction amount is more than the limit, and to trigger the twenty-third determining sub-module;

the twenty-third determining sub-module which is configured to determine whether random transaction selection is online transaction, if yes, to trigger a tenth setting sub-module; otherwise, to trigger a twenty-fourth determining sub-module;

the tenth setting sub-module which is configured to set a bit that random selection is online process, and to trigger the twenty-fourth determining sub-module;

the twenty-fourth determining sub-module which is configured to determine whether an upper limit and a lower limit of continuous offline transaction are read, if yes, to trigger a fifth sending sub-module; otherwise, to trigger the action analyzing module 210;

the fifth sending sub-module which is configured to send an obtaining data command to the IC card;

a fifth receiving sub-module which is configured to receive application transaction counter and a last time value of the online application transaction counter which are returned from the IC card;

a twenty-fifth determining sub-module which is configured to determine whether the fifth receiving sub-module receives the application transaction counter and the last time value of the online application transaction counter which re returned from the IC card, if yes, to trigger a twenty-sixth determining sub-module; otherwise, to trigger an eleventh setting sub-module;

the eleventh setting sub-module which is configured to set all of identification of lack of IC card data, identification of less than offline continuous transaction lower limit and identification of more than offline continuous transaction upper limit, and to trigger a twenty-sixth determining sub-module;

the twenty-sixth determining sub-module which is configured to determine whether a difference between the value of the application transaction counter and the value of last time online application transaction counter is more than offline continuous transaction lower limit, if yes, to trigger a twelfth setting sub-module; otherwise, to trigger a twenty-seventh determining sub-module;

the twelfth setting sub-module which is configured to set the identification that less than off-line continuous transaction lower limit, and to trigger the twenty-seventh determining sub-module;

the twenty-seventh determining sub-module which is configured to determine whether the difference between the value of the application transaction counter and the value of the last time online application transaction counter is more than the off-line continuous transaction upper limit, if yes, to trigger a thirteenth setting sub-module; otherwise, to trigger an twenty-eighth determining sub-module;

the thirteenth setting sub-module which is configured to set the identification that more than off-line continuous transaction upper limit, and to trigger a twenty-eighth determining sub-module;

the twenty-eighth determining sub-module which is configured to determine whether the value of last time online application transaction counter is 0, if yes, to trigger a fourteenth setting sub-module; otherwise, to trigger the acting analyzing module 210; and the fourteenth setting sub-module which is configured to set an identification of a new card.

Specifically, the acting analyzing module 210 includes that a twenty-ninth determining sub-module which is configured to determine whether set the transaction as reject, if yes, trigger a seventeenth setting sub-module; otherwise, trigger a thirtieth determining sub-module;

the thirtieth determining sub-module which is configured to determine whether it has connecting ability, if yes, to trigger a thirty-first determining sub-module; otherwise, to trigger a sixteenth setting sub-module;

the thirty-first determining sub-module which is configured to determine whether the transaction is set as online authentication, if yes, to trigger a fifteenth setting sub-module; otherwise, to trigger a thirty-second determining sub-module;

the fifteenth setting sub-module which is configured to set the password type as offline is needed, and to trigger a third obtaining sub-module;

the thirty-second determining sub-module which is configured to determine whether the transaction is set as reject, if yes, to trigger a seventeenth setting sub-module; otherwise, to trigger a sixteenth setting sub-module;

the sixteenth setting sub-module which is configured to set the password type as approve, and to trigger a third obtaining sub-module;

a seventeenth setting sub-module which is configured to set the password type as reject, and to trigger the third obtaining sub-module; and the third obtaining sub-module which is configured to obtain application cipher text from the IC card.

Specifically, in Embodiment 2, the online processing module 211 includes that a thirty-third determining sub-module which is configured to determine whether application authentication cipher text returned from the IC card is received, if yes, to trigger the transaction ending process module 212; otherwise, to trigger a thirty-fourth determining sub-module;

the thirty-fourth determining sub-module which is configured to determine whether composite dynamic data authentication/application authentication generation is executed, if yes, trigger a thirty-fifth determining sub-module; otherwise, trigger a sixth sending sub-module;

the thirty-fifth determining sub-module which is configured to determine whether a result obtained by processing the composite dynamic data authentication/application cipher text generation is a legitimate dynamic signature, if yes, trigger the sixth sending sub-module; otherwise, trigger a first identification sub-module;

the first identification sub-module which is configured to identify the result obtained by processing the composite dynamic data authentication/application cipher text generation as failure;

the sixth sending sub-module which is configured to send online requesting message to a host system of the card issuer;

a sixth receiving sub-module which is configured to receive an online response returned from the host system of the card issuer;

the thirty-sixth determining sub-module which is configured to determine whether a card issuer authentication is executed according to the online response, if yes, to trigger a seventh sending sub-module; otherwise, to trigger the transaction ending process module 212;

the seventh sending sub-module which is configured to send an external authentication command to the IC card; and the seventh receiving sub-module which is configured to receive a response of the external authentication command, and set a card issuer authentication indicator according to the response.

Specifically, in Embodiment 2, the transaction ending process module 212 includes that a first analyzing sub-module which is configured to analyze response data of generating cipher text command which is sent to the IC card for the first time;

a thirty-seventh determining sub-module which is configured to determine whether the response data includes an authorization request cipher text, if yes, to trigger a thirty-eighth determining sub-module; otherwise, to trigger a first setting sub-module;

the first setting sub-module which is configured to set an authorization response code as off-line confirming pass or offline rejection according to the response data and the result obtained by processing the composite dynamic data authentication/application cipher text generation;

the thirty-eighth determining sub-module which is configured to determine whether the transaction online is finished according to TLV data, if yes, to trigger a third setting sub-module; otherwise, to trigger a second analyzing sub-module;

the second analyzing sub-module which is configured to execute an action analysis by using a default a card issuer action code and a terminal action code;

the second setting sub-module which is configured to set the authorization response code as cannot online approval or cannot online or offline reject, to trigger a third setting sub-module;

the third setting sub-module which is configured to set the application cipher text as pass or rejection;

an eighth sending sub-module which is configured to send a final generating application cipher text command to the IC card;

an eighth receiving sub-module which is configured to obtain a transaction certificate or application authentication cipher text returned from the IC card;

a thirty-ninth determining sub-module which is configured to determine whether the response data includes a card issuer script in the case that the response data of the final generating application cipher text command is received, if yes, to trigger a processing sub-module; otherwise, end the method; and the processing sub-module which is configured to process the card issuer script.

In Embodiment 2, the processing sub-module includes that a first acting unit which is configured to make the first script as a current script;

an analyzing and acting unit which is configured to analyze the current script in sequence to obtain a script command, and make the first script command as a current script command;

a sending unit which is configured to send the current script command to the IC card;

a receiving unit which is configured to wait for receiving response data returned from the IC card;

a third determining unit which is configured to determine whether the response data received by the receiving unit is failure information, if yes, trigger a first setting unit; otherwise, trigger a fourth determining unit;

the first setting unit which is configured to set script processing result identification in a terminal authentication result, trigger a fifth determining unit;

a fourth determining unit which is configured to determine whether there exists unprocessed script command, if yes, make a next script command as a current script command, trigger the sending unit; otherwise, to trigger a fifth determining unit;

the fifth determining unit which is configured to determine whether there exists other script, if yes, to make a next script as a current script, and to trigger the analyzing and acting unit; otherwise, to trigger a second setting unit; and the second setting unit which is configured to set a script processed identification in transaction status information.

The solution in the present invention supports a password free and small amount payment on one hand, and supports the amount setting of password free on the other hand; a password free function is not set by an IC card, thus the IC card does not need to be upgraded; the password free function is set via a terminal; a bank sets an amount of password free, if the payment amount is less than the amount, it does not need a password; in the solution, a special user can set an amount for password free payment, that can distinguish with the privilege of some special IC cards for password free.

The technical solution in the Embodiment of the present invention is further described more clearly and completely with the drawings of the present invention. Apparently, Embodiments described herein are just a few Embodiments of the present invention. On the basis of Embodiments of the invention, all other related Embodiments made by those skilled in the art without any inventive work belong to the scope of the invention.

The invention claimed is:

1. A method for realizing an Europay, MasterCard® and Visa® (EMV) contact transaction without a password, wherein said method is implemented by an EMV integrated circuit (IC) card and a terminal, and the method comprises the following steps:

s1) selecting, by the terminal, an application in the case that the terminal receives transaction information, and setting a personal identification number (PIN) code free function;

s2) initializing, by the terminal, a selected current application, and processing an offline data authentication;

s3) executing, by the terminal, a processing limit;

s4) determining, by the terminal, whether the currently selected application needs a card holder to authenticate PIN code according to a PIN code free setting, if yes, executing step s5; otherwise, executing step s7;

s5) prompting, by the terminal, the card holder to input PIN code information, and determining whether the PIN code information is correct in the case that the PIN code information input by the card holder is received, if yes, executing step s6; otherwise, reporting an error, then ending the transaction;

s6) executing, by the terminal, a terminal risk management, an action analysis, an on-line process, and a transaction, then ending the transaction;

s7) executing, by the terminal, a terminal risk management, and an action analysis;

s8) determining, by the terminal, whether the current transaction needs an on-line processing according to the PIN code free function setting, if yes, executing the on-line processing, and executing step s9; otherwise, executing step s9; and s9) executing, by the terminal, a transaction ending the transaction;

executing the PIN code free function setting includes the following steps:

t1) obtaining, by the terminal, a selectable kernel configuration stored in an application parameter corresponding to the selected current application, determining whether the selectable kernel configuration is set, if yes, executing step t2; otherwise, executing step s2; and t2) obtaining, by the terminal, a PIN code free IC card transaction limit in the application parameter corresponding to the current application, and determining whether—a transaction amount in the transaction information is more than the PIN code free IC card transaction limit, if yes, executing step s2; otherwise, setting that the current application does not need the card holder to authenticate PIN code, and executing step s2.

2. The method as claimed in claim 1, wherein said setting the current application does not need the card holder to authenticate PIN code comprises that setting an offline PIN code identification and online PIN code identification as a first preset value, and setting a PIN code free IC card transaction identification; and said step s4 includes that determining, by the terminal, whether the offline PIN code identification and the online PIN code identification are the first preset value and the PIN code free IC card transaction identification is set, it does not need the card holder to authenticate PIN code and step s7 is executed in the case that the offline PIN code identification and the online PIN code identification are the first preset value and the PIN code free IC card transaction identification is set; otherwise, executing step s5.

3. The method as claimed in claim 1, wherein said selecting the application comprises the following steps:

a1) building, by the terminal, the application list according to the application, supported by the EMV IC card, in the transaction information;

a2) determining, by the terminal, whether there exists any application supported by the terminal in the application list, if yes, executing step a3; otherwise, ending the transaction;

a3) determining, by the terminal, whether a setting option supports the card holder to select application, if yes, executing step a4; otherwise, selecting an application from the application list as the current application according to a default rule, then executing step a11;

a4) displaying, by the terminal, the application list and prompting the card holder to select one therefrom;

a5) determining, by the terminal, whether selecting information is received from a user, if yes, executing Step A6; otherwise, ending the transaction;

a6) determining, by the terminal, whether the setting option supports the card holder to confirm application, if yes, executing step a7; otherwise, executing step a9;

a7) displaying, by the terminal, the application selected by the user and prompting the card holder to confirm the selection;

a8) determining, by the terminal, whether confirmation information is received from the card holder, if yes, executing step a11; otherwise, deleting the application selected by the user from the application list, then returning to step a2;

a9) determining, by the terminal, whether the application selected is that does not need the card holder to confirm but permitting the card holder to select, if yes, executing step a10; otherwise, ending the transaction;

a10) making, by the terminal, the application which is the highest level as the current application which is that does not need the card holder to confirm but permitting the card holder to select, and executing step a11;

a11) sending, by the terminal, a selecting instruction to the current application, and waiting for receiving a response returned from the IC card; and a12) determining, by the terminal, whether a successful response returned from the IC card is received, if yes, setting PIN code free function; otherwise, deleting the current application from the application list, and returning to step a2.

4. The method as claimed in claim 1, wherein said initializing the selected current application comprises the following steps:

b1) reading, by the terminal, data, needed by the IC card, in a processing option data object list;

b2) sending, by the terminal, a getting process option command to the IC card, and waiting for receiving data returned from the IC card;

b3) determining, by the terminal, whether a first preset information returned from the IC card is received, if yes, executing step b4; otherwise, executing Step B5;

b4) deleting, by the terminal, the current application, then ending the transaction;

b5) receiving, by the terminal, an application file locator and an application interchange profile; and b6) reading, by the terminal, the application data.

5. The method as claimed in claim 4, wherein said step b6 comprises the following steps:

b61) selecting, by the terminal, a first file entrance from the application file locator;

b62) reading, by the terminal, records via the file entrance;

b63) determining, by the terminal, whether the read record is data which is authenticated by offline data, if yes, executing step b64; otherwise, executing step b65;

b64) inputting, by the terminal, corresponding static data according to a static data authentication format, then executing step b65;

b65) determining, by the terminal, whether the read record is a last one of the file entrances of the application file locator, if yes, executing step b66; otherwise, returning to step b62; and b66) determining, by the terminal, whether there exists other file entrance of the application file locator, if yes, selecting the next file entrance of the application file locator, and returning to step b62; otherwise, executing an offline data authentication.

6. The method as claimed in claim 1, wherein said step s3 comprises the following steps:

s31) determining, by the terminal, whether both the IC card and the terminal provide application version numbers, if yes, executing step s32; otherwise, executing step s34;

s32) determining, by the terminal, whether the application version number provided by the IC card is just the same as the application version number provided by the terminal, if yes, executing step s34; otherwise, executing step s33;

s33) setting, by the terminal, an identification that the application version of the IC card is different from the application version of the terminal, then executing step s34;

s34) determining, by the terminal, whether a card issuer sets an application user control and card issuer country code, if yes, executing step s35; otherwise, executing step S37;

s35) determining, by the terminal, whether limit information in the IC card matches with limit information stored in the terminal, if yes, executing step s36; otherwise, executing step s37;

s36) setting, by the terminal, a bit that the IC card does not support a current service, then executing step s37;

s37) determining, by the terminal, whether an effective date of the IC card is later than the current date, if yes, executing step s38; otherwise, executing step s39;

s38) setting, by the terminal, a bit that application has not been effective, executing step s39; and s39) determining, by the terminal, whether the effective date of the IC card is earlier than the current date, if yes, executing step s310; otherwise, executing step s4;

s310) setting, by the terminal, a bit that the application is expired, then executing step s4.

7. The method as claimed in claim 1, wherein said executing terminal risk management comprises the following steps:

d1) determining, by the terminal, whether there exists any abnormal file, if yes, executing step d2; otherwise, executing step d4;

d2) determining, by the terminal, whether the abnormal file is in the current IC card, if yes, executing step d3; otherwise, executing step d4;

d3) setting, by the terminal, an identification that there is abnormal file in the card, executing step d4;

d4) determining, by the terminal, whether a user requests constraint connection, if yes, executing step d5; otherwise, executing step d6;

d5 setting, by the terminal, an identification that user forces a connection transaction, then executing step d6;

d6) determining, by the terminal, whether there exists transaction amount blog, if yes, executing step d7; otherwise, executing step d8;

d7) determining, by the terminal, whether the transaction amount blog includes a transaction of the current IC card, if yes, executing step d9; otherwise, executing step d8;

d8 determining, by the terminal, whether a current transaction amount is less than a lowest limit of the terminal, if yes, executing step d11; otherwise, executing step d10;

d9 determining, by the terminal, whether an amount obtained by an authorized amount plus an amount in the transaction amount blog is less than the lowest limit of the terminal, if yes, executing step d11; otherwise, executing step d10;

d10 setting, by the terminal, an identification that the transaction amount is more than limit, then executing step d11;

d11 determining, by the terminal, whether a random transaction option is an online transaction, if yes, executing step d12; otherwise, executing step d13;

d12 setting, by the terminal, an identification of random option online process, then executing step d13;

d13) determining, by the terminal, whether the upper limit and the lower limit of continuous offline transaction are read, if yes, executing step d14; otherwise, operating action analysis;

d14 sending, by the terminal, an obtaining data command to the IC card;

d15) determining, by the terminal, a value of an application transaction counter returned from the IC card and a value displayed last time by the application transaction counter are received, if yes, executing step d17; otherwise, executing step d16;

d16) setting, by the terminal, an identification of less of IC card data, an identification of less than offline continuous transaction lower limit and an identification of more than offline continuous transaction upper limit, then executing step d17;

d17) determining, by the terminal, whether a difference between the value of the application transaction counter and value displayed last time by the online application transaction counter is more than the offline continuous transaction lower limit, if yes, executing step d18; otherwise, executing step d21;

d18) setting, by the terminal, an identification of less than offline continuous transaction lower limit, then executing step d19;

d19) determining, by the terminal, whether the difference between the value of the application transaction counter and the value displayed last time by the online application transaction counter is more than the offline continuous transaction upper limit, if yes, executing step d20; otherwise, executing step d21;

d20) setting, by the terminal, the identification of more than offline continuous transaction upper limit, then executing step d21;

d21) determining, by the terminal, whether the value displayed last time by the online application transaction counter is 0, if yes, executing step d22; otherwise, operating action analysis; and d22) setting, by the terminal, an identification of a new card.

8. The method as claimed in claim 1, wherein said operating action analysis comprises the following steps:

e1) determining, by the terminal, whether the transaction is set as rejection, if yes, executing step e7; otherwise, executing step e2;

e2) determining, by the terminal, whether the terminal has connection ability, if yes, executing step e3; otherwise, executing step e6;

e3) determining, by the terminal, whether the transaction is set as online authorization, if yes, executing step e4; otherwise, executing step e5;

e4) setting, by the terminal, a password type as online is needed, then executing step e8;

e5) determining, by the terminal, whether the transaction is set as rejection, if yes, executing step e7; otherwise, executing step e6;

e6) setting, by the terminal, the password type as offline permission, then executing step e8;

e7) setting, by the terminal, the password type as offline rejection, then executing step e8; and e8) obtaining, by the terminal, an application cipher text from the IC card.

9. The method as claimed in claim 1, wherein said online process comprises the following steps:

f1) determining, by the terminal, whether an application authentication cipher text returned from the IC card is received, if yes, operating the transaction end process; otherwise, executing step f2;

f2) determining, by the terminal, whether composite dynamic data authentication/application cipher text generating is executed, if yes, executing step f3; otherwise, executing step f4;

f3) determining, by the terminal, whether a result of the composite dynamic data authentication/application cipher text generating is a legitimate dynamic signature, if yes, executing step f4; otherwise, identifying the result of the composite dynamic data authentication/application cipher text generating as failure;

f4) sending, by the terminal, an online request message to a host system of the card issuer;

f5) receiving, by the terminal, an online response returned from the host system of the card issuer;

f6) determining, by the terminal, whether a card issuer authentication is executed according to the online response, if yes, executing step f7; otherwise, operating the transaction ending process;

f7) sending, by the terminal, an external authentication command to the IC card; and f8) receiving, by the terminal, a response of the external authentication command, and setting a card issuer authentication indicator according to the response of the external authentication command.

10. The method as claimed in claim 9, wherein said operating the transaction ending process comprises the following steps:

g1) analyzing, by the terminal, a response data of generating application cipher text command which is sent to the IC card for the first time;

g2) determining, by the terminal, whether the response data includes authorization request cipher text, if yes, executing step g4; otherwise, executing step g3;

g3) setting, by the terminal, an authorization response code as offline confirming pass or offline rejection according to the response data and the result of composite dynamic data authentication/application cipher text generating, then ending the transaction;

g4) determining, by the terminal, whether the transaction online is finished according to tag length value (TLV) data, if yes, executing step g7; otherwise, executing step g5;

g5) executing, by the terminal, a terminal action analysis by using a default card issuer action code and a terminal action code;

g6) setting, by the terminal, the authorization response code as cannot online permit or cannot connection, offline rejection, then executing step g7;

g7) setting, by the terminal, the application cipher text as pass or rejection;

g8) obtaining, by the terminal, a transaction certificate or the application authentication cipher text by sending a final generating application cipher text command to the IC card;

g9) determining, by the terminal, whether the response data includes a card issuer script in the case that the terminal receives the response data of the final generating application cipher text command, if yes, executing step g10; otherwise, ending the transaction; and g10) processing, by the terminal, the card issuer script.

11. A device for realizing contact transaction with an EMV IC card, wherein said device comprises a selecting application module, a PIN code free setting module, an initializing module, an off-line authenticating module, a processing limit module, a first determining module, a prompting to receive module, a second determining module, a risk managing module, an action analyzing module, an on-line processing module, a transaction-ending processing module, and a third determining module;

the selecting application module is configured to select an application when the terminal receives transaction information, and trigger the PIN code free setting module;

the PIN code free setting module is configured to set the PIN code free function, and trigger the initializing module;

the initializing module is configured to initialize the current application selected by the selecting application module, and trigger the off-line authenticating module;

the off-line authenticating module is configured to authenticate off-line data, and trigger the processing limit module;

the processing limit module is configured to operate a processing limit, and trigger the first determining module;

the first determining module is configured to determine whether the currently selected application needs the card holder to authenticate PIN code according to the PIN code free function setting, if yes, trigger the prompting to receive module; otherwise, trigger the risk managing module;

the prompting to receive module is configured to prompt the card holder to input PIN code information, and receive the PIN code information input by the card holder;

the second determining module is configured to determine whether the PIN code information is correct when the prompting to receive module receives the PIN code information input by the card holder, if yes, triggering the risk managing module, otherwise reporting error;

the risk managing module is configured to manage the terminal risk, and trigger the action analyzing module;

the action analyzing module is configured to analyze an action, and trigger the on-line processing module or the third determining module;

the on-line processing module is configured to operate the on-line processing, and trigger the transaction-ending processing module;

the transaction-ending processing module is configured to process the transaction ending; and the third determining module is configured to determine whether the current transaction needs on-line processing according to PIN code free function setting; if yes, triggering the on-line processing module, otherwise triggering the transaction-ending processing module; and the PIN code free setting module includes that a first obtaining sub-module which is configured to obtain the selectable core configure identification stored in the application parameter corresponding to the current application which is chosen by the selecting application module;

a first determining sub-module which is configured to determine whether the selectable core configure identification obtained by the first obtaining sub-module is set, if yes, triggering a second obtaining sub-module; otherwise, triggering the initializing module;

a second obtaining sub-module which is configured to obtain a PIN code free IC card transaction limit in the application parameter corresponding to the current application which is selected by the selecting application module;

a second determining sub-module which is configured to determine whether a transaction amount in the transaction information is more than the PIN code free IC card transaction limit obtained by the second obtaining sub-module, if yes, triggering the initializing module; otherwise, triggering a first setting sub-module; and the first setting sub-module which is configured to set that the current application does not need the card holder to authenticate PIN code, and trigger the initializing module.

12. The device as claimed in claim 11, wherein the first setting sub-module is specifically configured to set an off-line PIN code identification and an on-line PIN code identification as a first preset value, set a PIN code free IC card transaction identification, and trigger the initializing module; and the first determining module is specifically configured to determine whether the off-line PIN code identification and the on-line PIN code identification are the first preset value and whether the PIN code free IC card transaction identification is set, it does not need a card holder to authenticate PIN code and trigger the risk managing module in the case that the off-line PIN code identification and the on-line PIN code identification are the first preset value and the PIN code free IC card transaction identification is set; otherwise, trigger the prompting to receive module.

13. The device as claimed in claim 11, wherein the selecting application module comprises a first building sub-module which is configured to build the application list according to an application, supported by the EMV IC card, in the transaction information;

a third determining sub-module which is configured to determine whether the application list built by the first building sub-module includes an application supported by the terminal, if yes, triggering a fourth determining sub-module; otherwise, ending the transaction;

the fourth determining sub-module which is configured to determine whether a setting option supports the card holder to select application, if yes, triggering a first displaying prompting sub-module; otherwise, triggering a first selecting sub-module;

the first selecting sub-module which is configured to select one application from the application list built by the first building sub-module as a current application according to a default rule, and trigger a first sending sub-module;

the first displaying prompting sub-module which is configured to display the application list built by the first building sub-module and prompt the card holder to select one therefrom, and trigger a fifth determining sub-module;

the fifth determining sub-module which is configured to determine whether selecting information is received from a user, if yes, triggering a sixth determining sub-module; otherwise, ending the transaction;

the sixth determining sub-module which is configured to determine whether the setting option supports the card holder to confirm the application, if yes, triggering a second displaying prompting sub-module; otherwise, triggering an eighth determining sub-module;

the second displaying prompting sub-module which is configured to display the application selected by the user and prompt the card holder to confirm the same, and triggering a seventh determining sub-module;

the seventh determining sub-module which is configured to determine whether confirmation information is received from the card holder, if yes, triggering a first sending sub-module; otherwise, triggering a first deleting sub-module;

the first deleting sub-module which is configured to delete the application selected by the user from the application list built by the first building sub-module, and trigger a third determining sub-module;

the eighth determining sub-module which is configured to determine whether the selected application is an application which does not need the card holder to confirm but permits the card holder to select, if yes, triggering a first acting sub-module; otherwise, ending the transaction;

the first acting sub-module which is configured to make the highest level application as a current application which does not need the card holder to confirm but permits the card holder to select, and trigger a first sending sub-module;

the first sending sub-module which is configured to send a selecting command to the current application;

a first receiving sub-module which is configured to wait for receiving a response returned from the EMV IC card;

a ninth determining sub-module which is configured to determine whether the first receiving sub-module receives a successful response returned from the EMV IC card, if yes, triggering the PIN code free setting module; otherwise, triggering a second deleting sub-module; and the second deleting sub-module which is configured to delete the current application from the application list built by the first building sub-module, and trigger the third determining sub-module.

14. The device as claimed in claim 11, wherein the initializing module comprises a first reading sub-module which is configured to read data, needed by the IC card, in a process option data object list;

a second sending sub-module which is configured to send a getting process option command to the IC card;

a second receiving sub-module which is configured to wait for receiving data returned from the IC card;

a tenth determining sub-module which is configured to determine whether the second receiving sub-module receives a first preset information returned from the IC card, if yes, triggering a third deleting sub-module; otherwise, triggering a third receiving sub-module;

the third deleting sub-module which is configured to delete the current application;

the third receiving sub-module which is configured to receive an application file locator and an application interchange profile; and the second reading sub-module which is configured to read application data.

15. The device as claimed in claim 14, wherein the second reading sub-module comprises a first selecting unit which is configured to select a first file entrance from the application file locator;

a first reading unit which is configured to read a record via the file entrance;

a first determining unit which is configured to determine whether the record read by the first reading unit is data which applies to off-line data authentication, if yes, triggering an inputting unit; otherwise, triggering a second determining unit;

the inputting unit which is configured to input corresponding static data according to the static data authentication format, and trigger the second determining unit;

the second determining unit which is configured to determine whether the record read by the first reading unit is a last one in the file entrance of the application file locator; if yes, triggering a third determining unit; otherwise, triggering the first reading unit;

the third reading unit which is configured to determine whether there exists other file entrance of the application file locator, if yes, triggering a second selecting unit; otherwise, triggering the off-line authenticating module; and the second selecting unit which is configured to select the next file entrance of the application file locator, and trigger the first reading unit.

16. The device as claimed in claim 11, wherein the processing limit module comprises an eleventh determining sub-module which is configured to determine whether both the IC card and the terminal provide application version numbers, if yes, triggering a twelfth determining sub-module; otherwise, triggering a thirteenth determining sub-module;

the twelfth determining sub-module which is configured to determine whether the application version number provided by the IC card is just the same as the application version number provided by the terminal, if yes, triggering the thirteenth determining sub-module; otherwise, triggering a third setting sub-module;

the third setting sub-module which is configured to set an identification that the application version number provided by the IC card is different from the application version number provided by the terminal, and trigger the thirteenth determining sub-module;

the thirteenth determining sub-module which is configured to determine whether a card issuer sets an application user controlling and card issuer country code, if yes, triggering a fourteenth determining sub-module; otherwise, triggering a fifteenth determining sub-module;

the fourteenth determining sub-module which is configured to determine whether constraint information in the EMV IC card matches with constraint information stored in the terminal, if yes, triggering a fourth setting sub-module; otherwise, triggering the fifteenth determining sub-module;

the fourth setting sub-module which is configured to set a bit that the EMV IC card does not support a current service, and trigger the fifteenth determining sub-module;

the fifteenth determining sub-module which is configured to determine whether an effective date of the IC card is later than the current date, if yes, triggering the fifth setting sub-module; otherwise, triggering a sixteenth determining sub-module;

the fifth setting sub-module which is configured to set a bit that application has not been effective, and trigger the sixteenth determining sub-module;

the sixteenth determining sub-module which is configured to determine whether the effective date of the IC card is earlier than the current date, if yes, triggering a fifth setting sub-module; otherwise, triggering the first determining module; and the sixth setting sub-module which is configured to set a bit that application has been expired, and trigger the first determining module.

17. The device as claimed in claim 11; wherein the risk managing module comprises a seventeenth determining sub-module which is configured to determine whether there exists abnormal file, if yes, triggering an eighteenth determining sub-module; otherwise, triggering the eighteenth determining sub-module;

the eighteenth determining sub-module which is configured to determine whether the abnormal file is in the IC card, if yes, triggering a seventh setting sub-module; otherwise, triggering the eighteenth determining sub-module;

the seventh setting sub-module which is configured to set an identification that the card is in the abnormal file, and trigger the eighteenth determining sub-module;

the eighteenth determining sub-module which is configured to determine whether a user requests a force connection, if yes, triggering an eighth setting sub-module; otherwise, triggering a nineteenth determining sub-module;

the eighth setting sub-module which is configured to set an identification that the user forces an on-line transaction, and trigger the nineteenth determining sub-module;

the nineteenth determining sub-module which is configured to determine whether there exists transaction amount blog, if yes, triggering a twentieth determining sub-module; otherwise, triggering a twenty-first determining sub-module;

the twentieth determining sub-module which is configured to determine whether the transaction amount blog includes transaction of the current IC card, if yes, triggering a twenty-second determining sub-module; otherwise, triggering the twenty-first determining sub-module;

the twenty-first determining sub-module which is configured to determine whether the current transaction amount is less than a lowest limit of the terminal, if yes, triggering a twenty-third determining sub-module; otherwise, triggering the ninth setting sub-module;

the twenty-second determining sub-module which is configured to determine whether an amount obtained by an authorization amount plus an amount of the transaction amount blog is less than the lower limit of the terminal, if yes, triggering the twenty-third determining sub-module; otherwise, triggering the ninth setting sub-module;

the ninth setting sub-module which is configured to set an identification that the transaction amount is more than the limit, and trigger the twenty-third determining sub-module;

the twenty-third determining sub-module which is configured to determine whether a random transaction is an on-line transaction, if yes, triggering a tenth setting sub-module; otherwise, triggering a twenty-fourth determining sub-module;

the tenth setting sub-module which is configured to set an identification of random selection on-line process, and trigger the twenty-fourth determining sub-module;

the twenty-fourth determining sub-module which is configured to determine whether a continuous off-line transaction upper limit and a continuous off-line transaction lower limit are read, if yes, triggering a fifth sending sub-module; otherwise, triggering the action analyzing module;

the fifth sending sub-module which is configured to send a getting data command to the EMV IC card;

a fifth receiving sub-module which is configured to receive a value of an application transaction counter and a value displayed last time on the on-line application transaction counter, which are returned from the EMV IC card;

the twenty-fifth determining sub-module which is configured to determine whether the value of the application transaction counter and the value displayed last time on the on-line application transaction counter returned from the EMV IC card are received by the fifth receiving sub-module, if yes, triggering a twenty-sixth determining sub-module; otherwise, triggering an eleventh setting sub-module;

the eleventh setting sub-module which is configured to set an identification of lacking the EMV IC card data, an identification of less than off-line continuous transaction lower limit and an identification of more than off-line continuous transaction upper limit, and trigger a twenty-sixth determining sub-module;

the twenty-sixth determining sub-module which is configured to determine whether a difference between the value of the application transaction counter and the value displayed last time on the on-line application transaction counter is less than the off-line continuous transaction lower limit, if yes, triggering a twelfth setting sub-module; otherwise, triggering a twenty-seventh determining sub-module;

the twelfth setting sub-module which is configured to set the identification of less than off-line application transaction lower limit, and trigger a twenty-seventh determining sub-module;

the twenty-seventh determining sub-module which is configured to determine whether a difference between the value of the application transaction counter and the value displayed last time on-line on the application transaction counter is more than the off-line continuous transaction upper limit, if yes, triggering a thirteenth setting sub-module; otherwise, triggering a twenty-eighth determining sub-module;

the thirteenth setting sub-module which is configured to set the identification of more than off-line continuous transaction upper limit, and trigger a twenty-eighth determining sub-module;

the twenty-eighth determining sub-module which is configured to determine whether the value displayed last time on-line on application transaction counter is 0, if yes, triggering a fourteenth setting sub-module, otherwise, triggering the action analyzing module; and the fourteenth setting sub-module which is configured to set a new card identification.

18. The device as claimed in claim 11, wherein the action analyzing module comprises the twenty-ninth determining sub-module which is configured to determine whether the transaction is set as rejection, if yes, triggering a seventeenth setting sub-module; otherwise, triggering a thirtieth determining sub-module;

the thirtieth determining sub-module which is configured to determine whether it has on-line ability, if yes, triggering a thirty-first determining sub-module; otherwise, triggering a sixteenth setting sub-module;

the thirty-first determining sub-module which is configured to determine whether the transaction is set as on-line authorization, if yes, triggering a fifteenth setting sub-module; otherwise, triggering a thirty-second determining sub-module;

the fifteenth setting sub-module which is configured to set a password type as a needing connection, and trigger a third obtaining sub-module;

the thirty-second determining sub-module which is configured to determine whether the transaction is set as rejection, if yes; triggering a seventeenth setting sub-module; otherwise, triggering a sixteenth setting sub-module;

the sixteenth setting sub-module which is configured to set the password type as off-line approval; and trigger the third obtaining sub-module;

the seventeenth setting sub-module which is configured to set the password type as off-line rejection, and trigger the third obtaining sub-module; and the third obtaining sub-module which is configured to obtain application cipher text from the IC card.

19. The device as claimed in claim 11, wherein the on-line processing module comprises the thirty-third determining sub-module which is configured to determine whether an application authentication cipher text is received from the IC card, if yes, triggering the transaction ending module; otherwise, trigger a thirty-fourth determining sub-module;

the thirty-fourth determining sub-module which is configured to determine whether composite dynamic data authentication/application cipher text generating is executed, if yes, triggering the thirty-fifth determining sub-module; otherwise, triggering a sixth sending sub-module;

the thirty-fifth determining sub-module which is configured to determine whether a result of executing composite dynamic data authentication/application cipher text generating is a legitimate signature, if yes, triggering the sixth sending sub-module; otherwise, triggering a first identifying sub-module;

the first identifying sub-module which is configure to identify the result of executing composite dynamic data authentication/application cipher text generating as failure;

the sixth sending sub-module which is configured to send an online request message to a host system of the card issuer;

the sixth receiving sub-module which is configured to receive an on-line response returned from the host system of the card issuer;

the thirty-sixth determining sub-module which is configured to determine whether a card issuer authentication is executed according to the on-line response, if yes, triggering a seventh sending sub-module; otherwise, triggering the transaction ending processing module;

the seventh sending sub-module which is configured to send an external authentication command to the IC card; and the seventh receiving sub-module which is configured to receive a response from the external authentication command, and set a card issuer authentication indicator according to the response from the external authentication command.

20. The device as claimed in claim 19, wherein the transaction ending processing module comprises a first analyzing sub-module which is configured to analyze response data of generating application cipher text command which is sent to the EMV IC card for the first time;

a thirty-seventh determining sub-module which is configured to determine whether a response data includes an authorization request cipher text, if yes, triggering the thirty-eighth determining sub-module; otherwise, triggering a first setting sub-module;

the first setting sub-module which is configured to set an authorization code as off-line confirm to pass or off-line rejection according to the response data and the result of executing composite dynamic data authentication/application cipher text generating;

the thirty-eighth determining sub-module which is configured to determine whether transaction on-line is finished according to tag length value (TLV) data, if yes, triggering a third setting sub-module; otherwise, triggering a second analyzing sub-module;

the second analyzing sub-module which is configured to execute a terminal action analysis by using a default card issuer action code and a terminal action code;

the second setting sub-module which is configured to set the authorization code as cannot on-line approval or cannot connect, off-line rejection, and trigger a third setting sub-module;

the third setting sub-module which is configured to set the application cipher text as pass or rejection;

an eighth sending sub-module which is configured to send a final generating application cipher text command to the EMV IC card;

an eighth receiving sub-module which is configured to obtain transaction certificate or application authentication cipher text returned by the EMV IC card;

the thirty-ninth determining sub-module which is configured to determine whether the response data includes a card issuer script in the case that the response data of the final generating application cipher text command is received, if yes, triggering a processing sub-module; otherwise, ending the transaction; and the processing sub-module which is configured to process the card issuer script.

* * * * *